United States Patent
Liu et al.

(10) Patent No.: US 11,837,704 B2
(45) Date of Patent: Dec. 5, 2023

(54) ELECTROCHEMICAL DEVICES INCLUDING INTERNAL EDDY CURRENT HEATING

(71) Applicant: GM Global Technology Operations LLC, Detroit, MI (US)

(72) Inventors: Jingyuan Liu, Pudong (CN); Dewen Kong, Minhang (CN); Dave G. Rich, Sterling Heights, MI (US); Haijing Liu, Shanghai (CN); Lyall K. Winger, Waterloo (CA); Mark W. Verbrugge, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/561,031

(22) Filed: Dec. 23, 2021

(65) Prior Publication Data

US 2022/0200077 A1    Jun. 23, 2022

(30) Foreign Application Priority Data

Dec. 23, 2020   (CN) .......................... 202011535842.9

(51) Int. Cl.
  *H01M 10/615*   (2014.01)
  *H01M 50/569*   (2021.01)
(52) U.S. Cl.
  CPC ....... *H01M 10/615* (2015.04); *H01M 50/569* (2021.01)
(58) Field of Classification Search
  CPC ........................................... H01M 10/60–667
  See application file for complete search history.

(56) References Cited

U.S. PATENT DOCUMENTS

| 6,909,201 B2 | 6/2005 | Murty et al. |
| 10,375,830 B2 | 8/2019 | Dawley et al. |
| 10,777,998 B2 | 9/2020 | Conell et al. |
| 10,800,285 B2 | 10/2020 | Rich et al. |

(Continued)

FOREIGN PATENT DOCUMENTS

| CN | 111987314 A | * 11/2020 |
| CN | 114665192 A |   6/2022 |

(Continued)

OTHER PUBLICATIONS

JP-2013149414-A English machine translation (Year: 2013).*
KR-1020130072284-A English machine translation (Year: 2013).*
CN-111987314-A English machine translation (Year: 2020).*

*Primary Examiner* — Scott J. Chmielecki
(74) *Attorney, Agent, or Firm* — Harness, Dickey & Pierce, P.L.C.

(57) ABSTRACT

An electrochemical device according to various aspects of the present disclosure includes an electrochemical cell and an inductor coil. The electrochemical cell includes a current collector. The current collector includes an electrically-conductive material. The inductor coil is configured to generate a magnetic field. The magnetic field is configured to induce an eddy current in the current collector to generate heat in the current collector. In various aspects, the present disclosure also provides a method of internally heating an electrochemical cell. In various aspects, the present disclosure also provides a method of controlling heating of an electrochemical cell.

20 Claims, 12 Drawing Sheets

(56) References Cited

U.S. PATENT DOCUMENTS

| | | |
|---|---|---|
| 10,826,139 B2 | 11/2020 | Rich et al. |
| 10,998,595 B2 | 5/2021 | Winger et al. |
| 11,031,634 B2 | 6/2021 | Winger et al. |
| 11,152,813 B2 | 10/2021 | Winger et al. |
| 11,156,665 B2 | 10/2021 | Rich et al. |
| 11,228,059 B2 | 1/2022 | Winger et al. |
| 11,233,407 B2 | 1/2022 | Winger et al. |
| 11,577,624 B2 | 2/2023 | Hasan et al. |
| 2020/0235444 A1 | 7/2020 | Yu et al. |
| 2020/0276966 A1 | 9/2020 | Rich et al. |
| 2020/0278936 A1 | 9/2020 | Gopalakrishnan et al. |
| 2020/0388874 A1 | 12/2020 | Dawley et al. |
| 2022/0021044 A1 | 1/2022 | Kong et al. |
| 2022/0247015 A1* | 8/2022 | Du .................... H01M 10/6571 |

FOREIGN PATENT DOCUMENTS

| | | |
|---|---|---|
| DE | 102021114757 A1 | 6/2022 |
| JP | 2013149414 A * | 8/2013 |
| KR | 1020130072284 A * | 7/2013 |

* cited by examiner

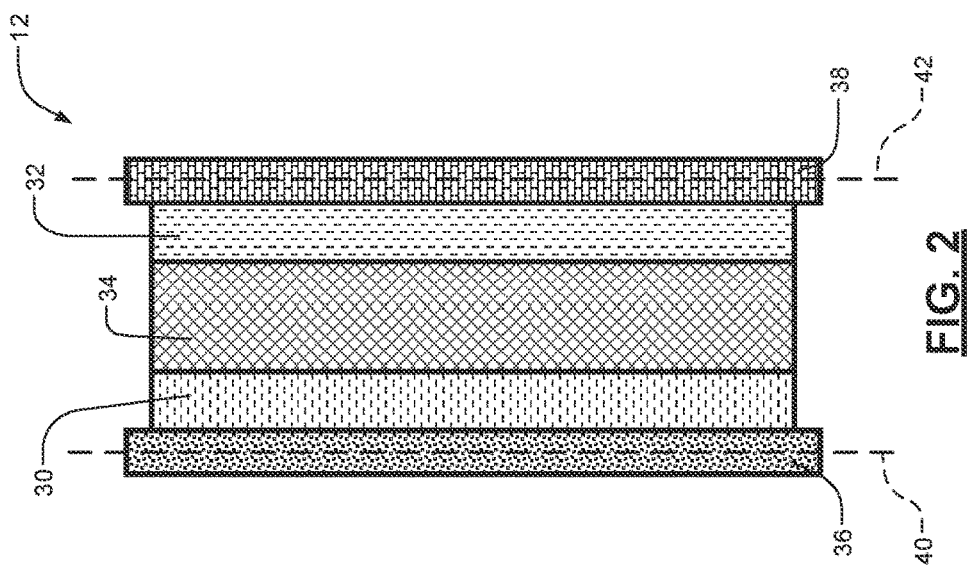
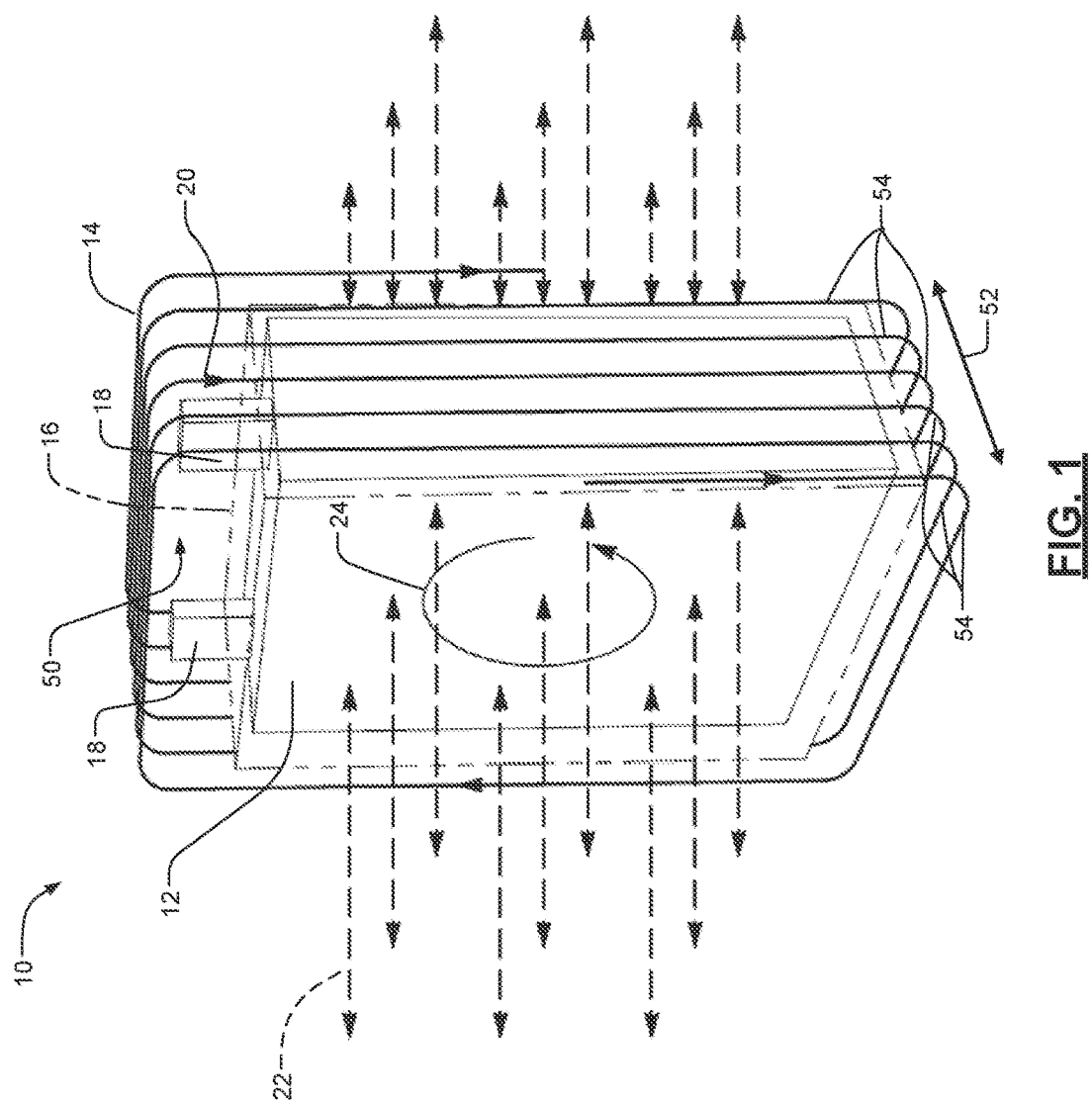

ELECTROCHEMICAL DEVICES INCLUDING INTERNAL EDDY CURRENT HEATING

CROSS-REFERENCE TO RELATED APPLICATIONS

This application claims the benefit and priority of Chinese Application No. 202011535842.9, filed Dec. 23, 2020. The entire disclosure of the above application is incorporated herein by reference.

INTRODUCTION

This section provides background information related to the present disclosure which is not necessarily prior art The present disclosure relates to electrochemical devices using internal eddy current heating, methods of heating electrochemical devices, and methods of controlling heating of electrochemical devices.

High-energy density electrochemical cells, such as lithium-ion batteries can be used in a variety of consumer products and vehicles, such as battery or hybrid electric vehicles. Battery powered vehicles show promise as a transportation option as technical advances continue to be made in battery power and lifetimes.

SUMMARY

This section provides a general summary of the disclosure, and is not a comprehensive disclosure of its full scope or all of its features.

In various aspects, the present disclosure provides an electrochemical device including an electrochemical cell and an inductor coil. The electrochemical cell includes a current collector. The current collector includes an electrically-conductive material. The inductor coil is configured to generate a magnetic field. The magnetic field is configured to induce an eddy current in the current collector to generate heat in the current collector.

In one aspect, the inductor coil defines a coil interior region. The electrochemical cell is at least partially disposed within the coil interior region.

In one aspect, the inductor coil has a substantially planar spiral shape.

In one aspect, the current collector is a first current collector and the electrochemical cell further includes a second current collector. The second current collector is substantially parallel to the first current collector. The inductor coil includes a first inductor coil associated with the first current collector and a second inductor coil associated with the second current collector.

In one aspect, the inductor coil includes a plurality of inductor coils. Each inductor coil of the plurality of inductor coils is configured to individually receive current independent of the other inductor coils of the plurality of inductor coils. Each inductor coil of the plurality of inductor coils is configured to induce eddy current in a respective region of the current collector.

In one aspect, the inductor coils of the plurality of inductor coils are disposed substantially coplanar to one another.

In one aspect, the electrochemical device further includes an insulating pouch at least partially enclosing the electrochemical cell.

In one aspect, the inductor coil is at least partially inside the insulating pouch.

In one aspect, the electrochemical cell includes a plurality of electrochemical cells. The insulating pouch includes a plurality of insulating pouches. The electrochemical cells are at least partially enclosed in the insulating pouches, respectively.

In one aspect, the inductor coil includes a single inductor coil.

In one aspect, the inductor coil includes a plurality of inductor coils. Each inductor coil of the plurality of inductor coils is configured to individually receive current independent of the other inductor coils of the plurality of inductor coils. Each inductor coil of the plurality of inductor coils is configured to heat a respective region of the electrochemical device.

In one aspect, the electrochemical device further includes a case. The case defines an interior region. The electrochemical cell and the insulating pouch are at least partially disposed within the case interior region. The inductor coil is between the case and the insulating pouch.

In one aspect, the electrochemical device further includes an electromagnetic shield that is configured to reduce the magnetic field outside of the electrochemical cell.

In one aspect, the electrochemical devices further includes a heater. The heater includes a ferromagnetic material. The magnetic field is configured to induce an eddy current in the heater to heat the heater.

In one aspect, the inductor coil has a substantially planar spiral shape. The inductor coil and the heater cooperate to form an integrated heater. The integrated heater includes the inductor coil, a heater, and an insulator. The heater is substantially parallel to the inductor coil. The insulator is between the inductor coil and the heater.

In one aspect, the electrochemical cell is a solid-state electrochemical cell. The current collector includes a first current collector and a second current collector. The electrochemical cell further includes a positive electrode, a negative electrode, and a solid-state electrolyte. The positive electrode is in electrical communication with the first current collector. The negative electrode is in electrical communication with the second current collector. The solid-state electrolyte is between the positive electrode and the negative electrode.

In one aspect, the electrochemical cell is electrically connected to the inductor coil. The electrochemical cell is configured to generate a current in the inductor coil. The electrochemical device is free of an external power source.

In one aspect, the electrochemical device further includes an external power source electrically connected to the inductor coil. The external power source is configured to generate a current in the inductor coil.

In various aspects, the present disclosure provides a method of internally heating an electrochemical cell. The method includes providing an electrochemical cell including a current collector and an inductor coil. The current collector includes an electrically-conductive material. The method further includes providing alternating current to the inductor coil to generate a magnetic field. The magnetic field includes an eddy current in the current collector to generate heat in the current collector.

In various aspects, the present disclosure provides a method of controlling heating of an electrochemical cell. The methods includes determining that a temperature of an electrochemical device is outside of a desired range. The electrochemical device includes an electrochemical cell and an inductor coil. The electrochemical cell includes a current collector including an electrically-conductive material. The temperature is a temperature of the electrochemical cell. The method further includes providing alternating current to the inductor coil to generate a magnetic field. The magnetic field induces an eddy current in the current collector to generate heat in the current collector.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 1 is a perspective view of an electrochemical assembly according to various aspects of the present disclosure, the electrochemical assembly including a peripheral inductor coil;

FIG. 2 is a sectional view of an electrochemical cell of the electrochemical assembly of FIG. 1;

Corresponding reference numerals indicate corresponding parts throughout the several views of the drawings.

DETAILED DESCRIPTION

Figure 3:
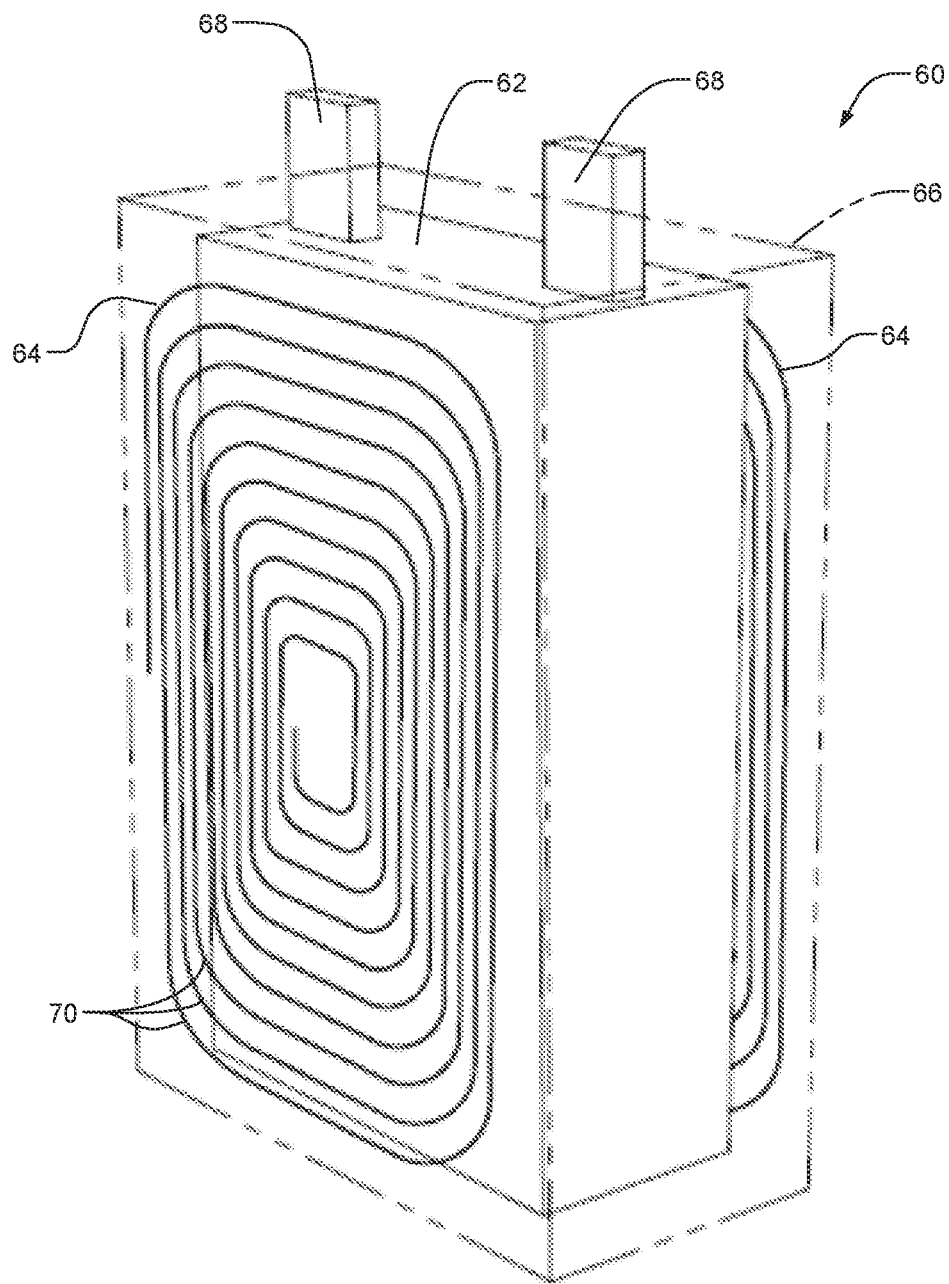
FIG. 3 is a perspective view of another electrochemical assembly according to various aspects of the present disclosure, the electrochemical assembly including planar inductor coils.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Example embodiments will now be described more fully with reference to the accompanying drawings.

The present technology pertains to a device including one or more electrochemical cells, such as rechargeable lithium-ion batteries, that may be used in vehicle applications. However, the present technology may also be used together with other electrochemical devices that cycle lithium ions.

Performance of an electrochemical cell may be temperature dependent. For example, lower temperatures may cause reduced power density, capacity loss during discharging, and/or dendrite formation during charging. However, some applications, such as vehicle applications, expose electrochemical cells to a wide range of environmental temperatures, including extreme climates, such as ultra-low temperatures. Therefore, in certain aspects, it may be beneficial to provide electrochemical cells with thermal management.

One method of thermal management includes fixing a heating film to an exterior of a pouch cell. The heating film may be coupled to a single side of the pouch cell, leaving the other side of the pouch cell vulnerable to heat loss and creating a non-uniform thermal distribution within the pouch cell. Furthermore, because the heating film is disposed outside of the pouch cell, a significant portion of the heat generated by the heating film is lost to the environment, particularly through an exterior side of the heating film. Lastly, because pouches are often formed from insulators, heat transfer from the heating film to an interior of the pouch cell is slow as it relies on conduction through the insulating pouch.

Another method of thermal management includes wrapping a pouch cell with a tube for circulating heating fluid. The heating fluid tube is disposed on the exterior of the pouch cell. Accordingly, this method experiences the same drawbacks of heat loss to the environment and slow heat transfer from the heater fluid into the interior of the pouch cell. Additionally, this method requires increased energy consumption to pump the heating fluid through the tubes, resulting in a lower energy density. Finally, a fluid heating system may be inefficient with respect to space, particularly where an electrochemical device includes several electrochemical cells having heating fluid tubes disposed therebetween.

Electrochemical Devices with Internal Eddy Current Heating

In various aspects, the present disclosure provides an electrochemical device having an internal eddy current heating system. The electrochemical device includes an electrochemical cell and an inductor coil. The inductor coil receives alternating current from the electrochemical cell or another power source to generate an alternating magnetic field, which induces an eddy current in conductive components of the electrochemical cell, such as the current collectors and/or electrodes. The eddy current generates heat in the conductive components. Therefore, heat generation is in situ with respect to the electrochemical cell.

Internal heating provides several benefits. First, in situ heat generation may have a higher efficiency than other methods of heating because it reduces or prevents energy loss to the environment so that a substantial portion of the energy remains within the electrochemical cell to heat the cell. Second, the electrochemical cell may be heated rapidly since it does not need to diffuse through an insulating pouch. Additionally, operating of the inductor coil may be controlled to prevent the electrochemical cell from cooling down. Third, the insulating pouch facilitates retention of the heat within the electrochemical cell by slowing convection to the environment. Accordingly, performance of the electrochemical cell (e.g., energy density) is less dependent on environmental temperature than a device having an external heater.

The inductor coil may be positioned and/or controlled to provide additional advantages. For example, the inductor coil can be arranged such that substantially the entire magnetic field is usable to create eddy current within the cell because magnetic induction lines are generally concentrated inside a coil. In certain aspects, greater than or equal to or about 90% of the magnetic field may induce eddy current in the electrochemical cell. Additionally, the device may include plurality of inductor coils that are independently controllable to generate heat in different regions of the device, such as to balance heat across a cell or stack. Finally, heat generation is tunable by controlling power of the inductor coil. Inductor coil power is controlled changing frequency of alternating current and/or number of windings of the inductor coil.

With reference to FIG. 1, an electrochemical assembly 10 (the "assembly") according to various aspects of the present disclosure is provided. The assembly 10 includes an electrochemical cell 12 and an inductor coil 14. The electrochemical cell 12 may be disposed at least partially within an electrically-insulating pouch 16. In certain aspects, the pouch 16 includes a material that is electrically insulating and thermally conductive. In one example, the pouch 16 includes a polymer, such as nylon. The pouch 16 may substantially retain heat in the electrochemical cell 12 and reduces heat loss to the environment. The electrochemical cell 12 includes a pair of conductive tabs 18 that extend through the pouch 16 for receiving electrical connections (not shown).

The assembly 10 is configured to internally heat the electrochemical cell 12 via eddy current. More particularly, the inductor coil 14 receives alternating current 20 from a power inverter in combination with the electrochemical cell 12 (see, e.g., FIG. 19), other electrochemical cells, an external power source, or any combination thereof (see, e.g., FIG. 20). The alternating current 20 generates an alternating magnetic field 22. The alternating magnetic field 22 induces eddy current 24 in conductive components in the electrochemical cell 12 (e.g., current collectors 36, 38, and/or electrodes 30, 32, described below). The conductive components act as resistors to dissipate heat in situ within the electrochemical cell 12.

Referring to FIG. 2, the electrochemical cell 12 generally includes a first electrode 30, such as a positive electrode or cathode, a second electrode 32 such as a negative electrode or an anode, and a solid-state electrolyte. In certain aspects, the electrochemical cell 12 may include a liquid and/or gel electrolyte and a separator instead of the solid-state electrolyte 34 (not shown). The electrochemical cell 12 further includes a first or positive electrode current collector 36 and a second or negative electrode current collector 38, which are each electrically connected to one of the tabs 18 (FIG. 1).

The electrochemical cell 12 may be a lithium-ion electrochemical cell that operates by reversibly passing lithium ions between the negative electrode 32 and the positive electrode 30. The solid-state electrolyte 34 is disposed between the negative and positive electrodes 32, 30. The solid-state electrolyte 34 is suitable for conducting lithium ions. Lithium ions move from the positive electrode 30 to the negative electrode 32 during charging of the electrochemical cell 12 and in the opposite direction when discharging the electrochemical cell 12.

One or more electrochemical cells 12 may be incorporated in a lithium-ion battery pack. The electrochemical cells 12 may be electrically connected in a stack to increase overall output. Each of the negative and positive electrodes 32, 30 within the stack may be connected by an external circuit via the tabs 18 to allow current generated by electrons to pass between the negative and positive electrodes 32, 30 to compensate for transport of lithium ions.

The current collectors 36, 38 are conductive. For example, the positive electrode current collector 36 may include aluminum and the negative electrode current collector 38 may include copper. Therefore, that alternating magnetic field 22 may induce the eddy current 24 (FIG. 1) in one or both of the current collectors 36, 38 and/or electrodes 30, 32 when the alternating current 20 flows through the inductor coil 14. The current collectors 36, 38 may be in the form of sheets such that they each have two major dimensions (e.g., a height and a width) that are substantially larger than a minor dimension (e.g., a thickness). Accordingly, the positive and negative electrode current collectors 36, 38 define respective first and second planes 40, 42 defined by the major dimensions. During heating, the alternating magnetic field 22 (FIG. 1) defines a direction substantially perpendicular to the planes 40, 42 while the eddy current 24 is within the planes 40, 42.

Inductor Coils

An inductor coil according to various aspects of the present disclosure is configured to generate a magnetic field to induce current within an electrochemical cell. In certain aspects, the inductor coil is configured to conduct alternating current having a frequency of about 10 Hz-200 kHz (e.g., 10-50 Hz, 50-100 Hz, 100-250 Hz, 250-500 Hz, 500 Hz-1 kH, 1-40 kHz, 1-5 kHz, 5-10 kHz, 10-20 kHz, 20-50 kHz, 50-100 kHz, 100-150 kHz, or 150-200 kHz). In one example, the frequency is about 1-40 kHz. The inductor coil is formed from a conductive material, such as copper. The inductor coil includes a plurality of windings or turns. A number of windings may be determined based on amount of power needed, which may be related to sizes and/or properties of the electrochemical cells 12. Heating power of the inductor coil is tunable by modifying AC frequency and/or number of windings. For example, heating power may be increased by increasing AC frequency or number of windings.

Inductor coils may have a variety of shapes, sizes, and arrangements in an electrochemical device. In certain aspects, an electrochemical device includes one or more peripheral inductor coils, one or more planar inductor coils, or a combination thereof, as described below. A style of inductor coil may be chosen, in part, due to space constraints. More specifically, peripheral inductor coils may allow electrochemical cells within a stack to be closer to one another, while planar induction coils may leave open more space around a periphery of the device.

Peripheral Inductor Coils

Returning to FIG. 1, the inductor coil 14 is a peripheral inductor coil. The inductor coil 14 defines an interior region 50. The electrochemical cell 12 is at least partially disposed within the interior region 50. The inductor coil 14 extends along a length 52 and includes a plurality of windings 54. Each winding 54 forms a substantially rectangular shape around a periphery of the electrochemical cell 12. However, in various other aspects, windings may define other shapes, such as substantially circular such that an inductor coil forms a helix. In certain aspects, the inductor coil 14 may be configured to induce a higher current and corresponding higher heat in outer regions of the current collectors 36, 38 (i.e., closer to the inductor coil 14) and a lower current and corresponding lower heat in center regions of the current collectors 36, 38 (i.e., further from the inductor coil 14).

Planar Inductor Coils

With reference to FIG. 3, another electrochemical assembly 60 according to various aspects of the present disclosure is provided. The assembly 60 generally includes an electrochemical cell 62, inductor coils 64, an insulating pouch 66, and a pair of tabs 68. The electrochemical cell 62, the insulating pouch 66, and the tabs 68 are similar to the electrochemical cell 12, the insulating pouch 16, and the tabs 18 of FIG. 1.

Each inductor coil 64 defines a spiral that lies substantially within a plane. That is, each inductor coil 64 has a height and a width that are substantially greater than a thickness or length. Each inductor coil 64 includes a plurality of windings 70. The windings 70 are substantially rectangular. However, in various other aspects, the windings may define other shapes, such as substantially circular.

The inductor coils 64 are substantially parallel to respective current collectors within the electrochemical cell 62. Each inductor coil 64 is configured to generate a magnetic field in a direction substantially perpendicular to its plane and eddy current substantially parallel to its plane (e.g., in a respective current collector of the electrochemical device 62). In certain aspects, compared to a peripheral inductor coil (e.g., the inductor coil 14 of FIG. 1), the inductor coil 64 may be configured to induce a higher current and corresponding higher heat in center regions of the current collectors and a lower current and corresponding lower heat in peripheral regions of the current collectors.

The assembly 60 includes two inductor coils 64, with each inductor coil 64 being disposed adjacent to a respective current collector of the electrochemical cell 62. Each inductor coil 64 may be associated with a respective current collector such that a substantial portion of then eddy current generated by the inductor coil 64 is in the respective current collector. However, a single inductor coil 64 may induce eddy current in both current collectors and other electrically-conductive components within the electrochemical cell 62. In various other aspects, the assembly 60 may include a single inductor coil or more than two inductor coils.

The inductor coils 64 are outside of the insulating pouch 66. The inductor coils 64 may be coupled to the insulating pouch 66, coupled to a separate film, and/or have a self-supporting rigid structure. In various other aspects, the inductor coils 64 may be disposed within the electrochemical cell 62. In one example, the inductor coils 64 are embedded within respective current collectors. In another example, each inductor coil 64 is between the insulating pouch 66 and a respective current collector. In yet another example, an inductor coil is covered by one or more electrical insulators that are penetrable to electrolyte and disposed between the current collectors.

Combination Inductor Coils

In various aspects, an electrochemical device may include both a peripheral inductor coil (e.g., the inductor coil 14 of FIG. 1) and a planar inductor coil (e.g., the inductor coil 64 of FIG. 3). Such an arrangement may be useful when the device has high thermal requirements. In certain aspects, the arrangement is configured for tailored heating of an electrochemical cell of the device. For example, the planar inductor coil may be operated (i.e., receive current) when the central portions of the electrochemical cell require heat and the peripheral inductor coil may be operated when outer regions of the electrochemical cell require heat.

Devices with Multiple Electrochemical Cells

In various aspects, the present disclosure provides an electrochemical device having a plurality of electrochemical cells, such as a stack. The device may be heated by a single induction coil or a plurality of induction coils. In certain aspects, the inductor coils of the plurality are independently controllable (e.g., on/off condition and/or frequency of alternating current).

Single Inductor Systems

Figure 4:
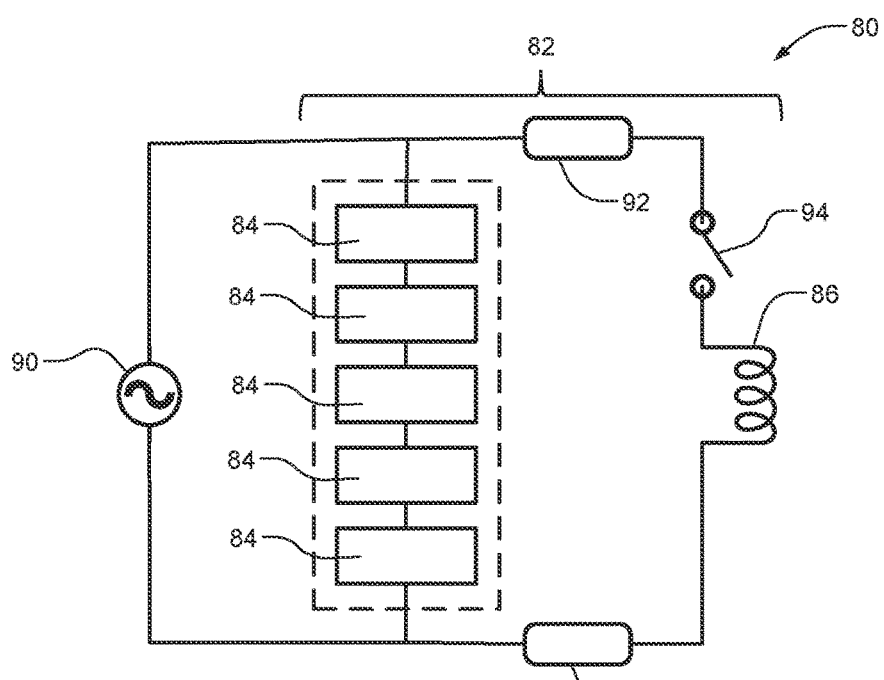
FIG. 4 is a circuit diagram for a single-inductor system according to various aspects of the present disclosure.

Referring to FIG. 4, a system 80 according to various aspects of the present disclosure is provided. The system 80 includes an electrochemical device 82 (see, e.g., electrochemical device 100 of FIG. 5). The electrochemical device 82 includes a plurality of electrochemical cells 84 and an inductor coil 86. The electrochemical cells 84 are connected in series. The system 80 may further include an external power source 90 for powering the inductor coil 86, two power inverters 92, and a switch 94 for selectively providing power to the inductor coil 86.

The inductor coil 86 may be a peripheral inductor coil or a planar inductor coil. In certain aspects, the inductor coil 86 is a single inductor coil configured to heat all of the electrochemical cells 84 of the plurality. The switch 94 may be closed to provide power to the inductor coil 86 to internally heat the electrochemical cells 84 inducing eddy current in internal conductive components of the electrochemical cells (e.g., current collectors, electrodes). In certain other aspects, the inductor coil 86 is configured to heat only a portion of the electrochemical cells 84.

Figure 5:
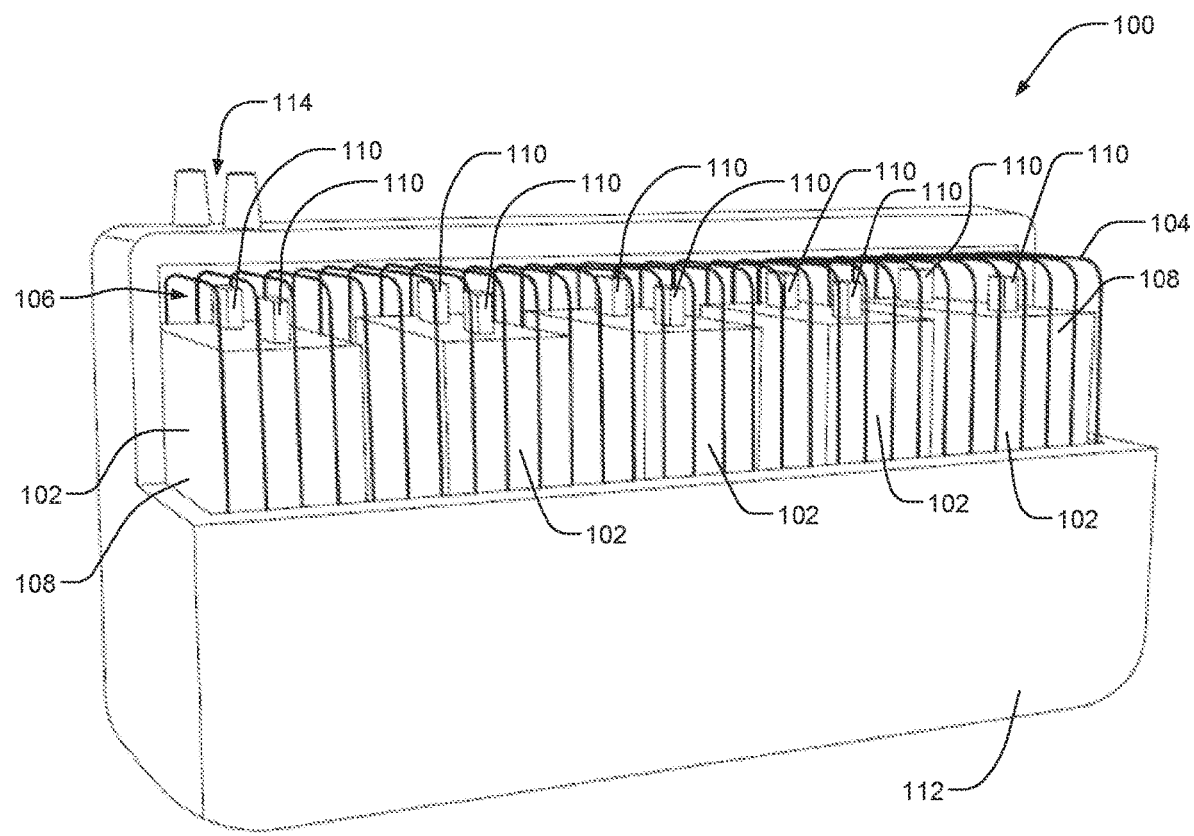
FIG. 5 is a perspective cutaway view of an electrochemical device according to various aspects of the present disclosure, the electrochemical device having a single peripheral inductor coil.

With reference to FIG. 5, a single-inductor electrochemical device 100 according to various aspects of the present disclosure is provided. The device 100 includes a plurality of electrochemical cells 102 and an inductor coil 104. In certain aspects, the inductor coil 104 is a peripheral inductor coil defining an interior region 106 in which the electrochemical cells 102 are at least partially disposed. In certain alternative aspects, the device 100 may include a single planar inductor coil (see, e.g., inductor coils 64 of FIG. 3).

The electrochemical cells 102 may be similar to the electrochemical cell 12 of FIGS. 1-2. Each electrochemical cell 102 includes an insulating pouch 108 and a pair of tabs 110. The electrochemical cells 102 and the inductor coil 104 are disposed in a case or shell 112 such that the inductor coil 104 is disposed between the insulating pouches 108 and the case 112. Although the case 112 is shown in cutaway, it may fully enclose the electrochemical cells 102 and inductor coil 104. A switch 114 may be closed to provide power to the inductor coil 104 and internally heat the electrochemical cells 102.

Multiple-Inductor Systems

Figure 6:
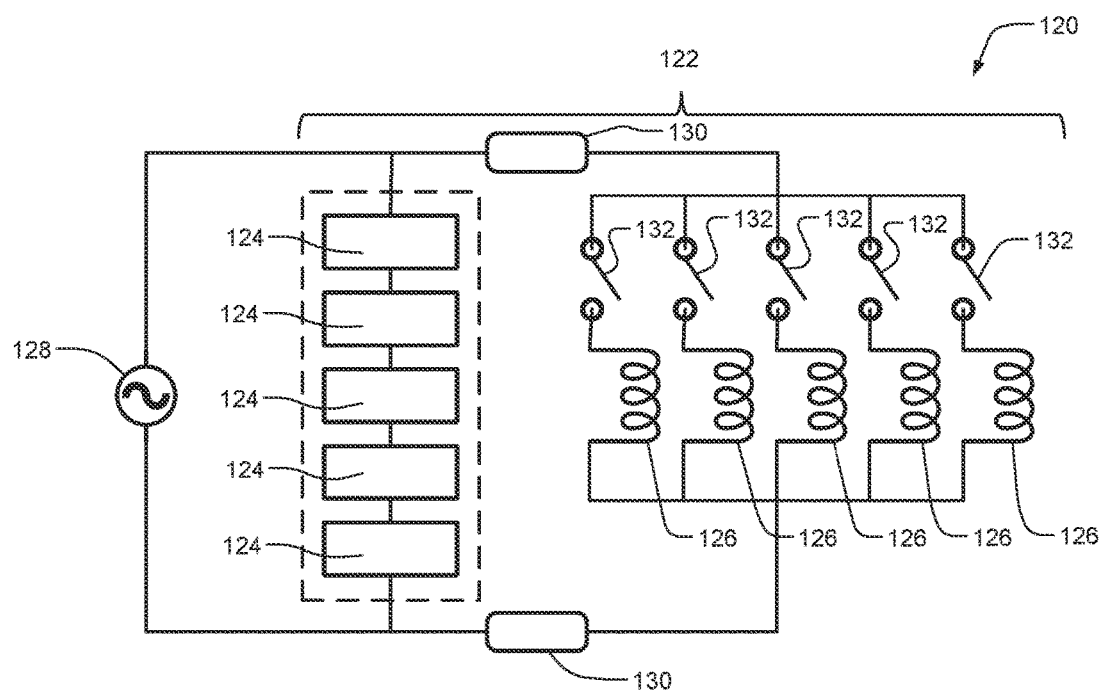
FIG. 6 is a circuit diagram for a multiple-inductor system according to various aspects of the present disclosure.

Referring to FIG. 6, a system 120 according to various aspects of the present disclosure is provided. The system 120 includes an electrochemical device 122. The electrochemical device 122 includes a plurality of electrochemical cells 124 connected in series. The system 120 further includes a plurality of inductor coils 126. The plurality of inductor coils 126 may include peripheral inductor coils, planar inductor coils, or both peripheral inductor coils and planar inductor coils.

In certain aspects, each inductor coil 126 is associated with a respective electrochemical cell 124. For example, the inductor coil 126 may be positioned such that a substantial portion of the eddy current during operation of the inductor coil 126 is induced in the associated electrochemical cell 124. Accordingly, a quantity of inductor coils 126 may be the same as a quantity of electrochemical cells 124 in the device 122. In certain other aspects, the device 122 includes more inductor coils 126 than electrochemical cells 124. In certain other aspects, the device 122 includes fewer inductor coils 126 than electrochemical cells 124 such that each inductor coil 126 may be associated with a portion of the plurality of electrochemical cells 124.

The system 120 further includes an external power supply 128 to power the inductor coils 126 and power inverters 130. However, the system 120 may alternatively be free of an external power supply (see, e.g., FIG. 19).

In certain aspects, the system 120 is configured for tailored heating, such as cell-by-cell heating. The system 120 further includes a plurality of switches 132. Each switch 132 is connected in series with a respective inductor coil 126. Therefore, the inductor coils 126 are individually operable to selectively heat different regions of the device 122, such as particular electrochemical cells 124. The switches 132 may be operated to prolong heating of certain electrochemical cells 124 via the associated inductor coil 126 and/or cease heating of certain electrochemical cells 124 when a desired temperature is reached, by way of example.

In an example, at the beginning of a heating period, all of the switches 132 may be closed to provide power to all of the inductor coils 126, thereby heating all of the electrochemical cells 124. If centrally-disposed electrochemical cells achieve a desired temperature quicker than outer electrochemical cells, then switches for the centrally-disposed electrochemical cells may be opened to cease heating the centrally-disposed electrochemical cells while the outer electrochemical cells continue to receive heat. Accordingly, a multiple-inductor or cell-by-cell system, such as the system 120, may be used to balance heat throughout the device 122.

In certain aspects, additionally or alternatively, a system is configured to provide different amounts of power in different regions of a device. In one example, inductor coils have different numbers of windings. More particularly, inductor coils associated with generally cooler regions of the device (e.g., outside electrochemical cells) may have more windings to provide a higher power in those regions, while inductor coils associated with generally warmer regions of the device (e.g., inside electrochemical cells) may have fewer windings to provide lower power in those regions. In another example, inductor coils are configured to receive different AC current having different frequencies in different regions of the cells. More particularly, inductor coils associated with cooler regions of the device receive higher-frequency AC, while inductor coils associated with warmer regions of the device receive lower-frequency AC. In yet another example, a system is configured for changing current distribution on coils of different electrochemical cells.

Figure 7:
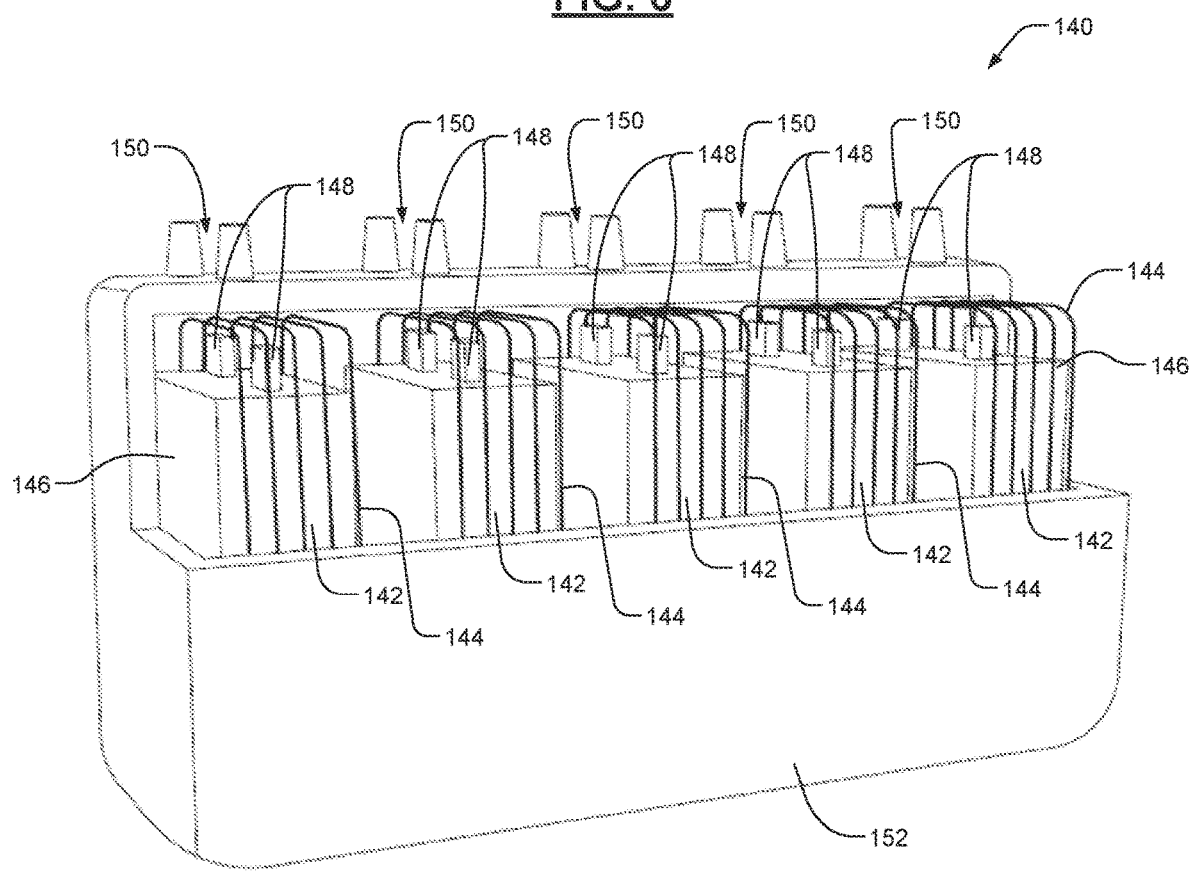
FIG. 7 is a perspective cutaway view of a multiple-inductor electrochemical device according to various aspects of the present disclosure.

With reference to FIG. 7, a multiple-inductor electrochemical device 140 according to various aspects of the present disclosure is provided. The device 140 includes a plurality of electrochemical cells 142 and a respective plurality of inductor coils 144 (which may, together, each be similar to the electrochemical assembly 10 of FIG. 1). Each electrochemical cell 142 is disposed within a respective insulating pouch 146, includes a pair of tabs 148, and may similar to the electrochemical cell 12 of FIGS. 1-2.

The inductor coils 144 are peripheral inductor coils. The device 140 further includes a plurality of switches 150. Each switch 150 is serially connected to a respective inductor coil 144. Accordingly, each switch 152 may be operated to power the respective inductor coil 144, thereby heating the respective electrochemical cell 142 independent of the other switches 150, inductor coils 144, and electrochemical cells 142.

The electrochemical cells 142 and inductor coils 144 are disposed within a case or shell 152. Each inductor coil 144 is disposed between the insulating pouch 146 of the respective electrochemical cell 142 and the case 152. The switches 150 are accessible from an outside of the case 152.

Figure 8:
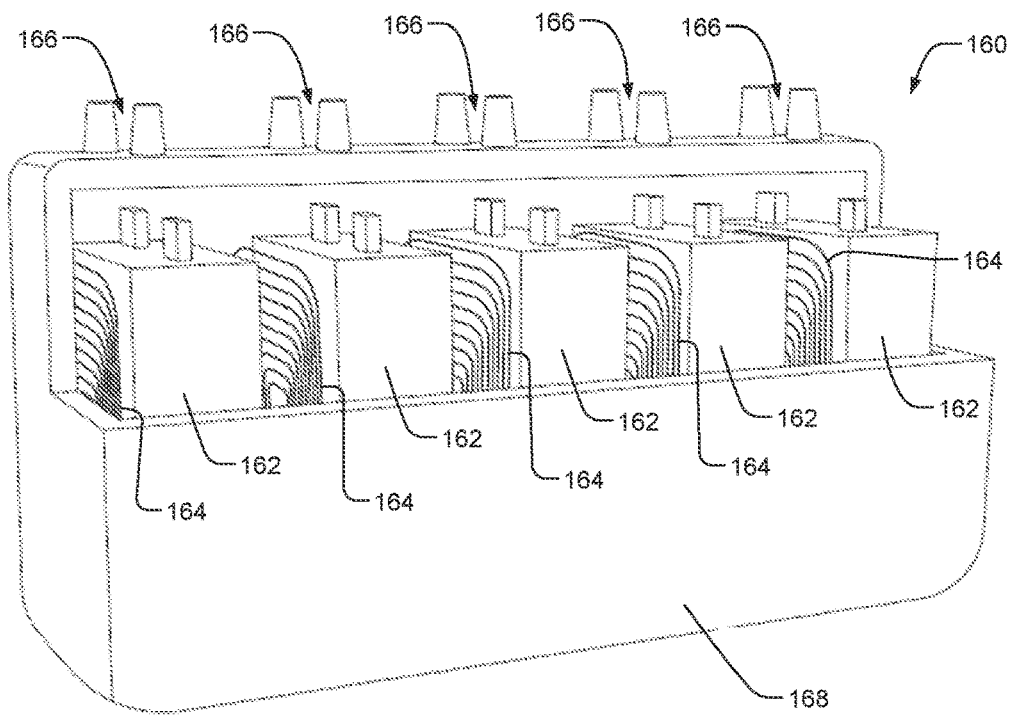
FIG. 8 is a perspective cutaway view of another multiple-inductor electrochemical device according to various aspects of the present disclosure.

Referring to FIG. 8, another multiple-inductor electrochemical device 160 according to various aspects of the present disclosure is provided. Unless otherwise described, the electrochemical device 160 is similar to the electrochemical device 140 of FIG. 7. The electrochemical device 160 generally includes a plurality of electrochemical cells 162, a plurality of inductor coils 164, a plurality of switches 166, and a case 168.

The inductor coils 164 are planar inductor coils. In certain aspects, each inductor coil 164 is associated with a respective electrochemical cell 162. In certain other aspects, each electrochemical cell 162 includes a pair inductor coils 164, with each inductor coil 164 being associated with a respective current collector of the electrochemical cell 142 (see, e.g., the electrochemical assembly 60 of FIG. 3).

Regional-Inductor Electrochemical Cells

Figure 9:
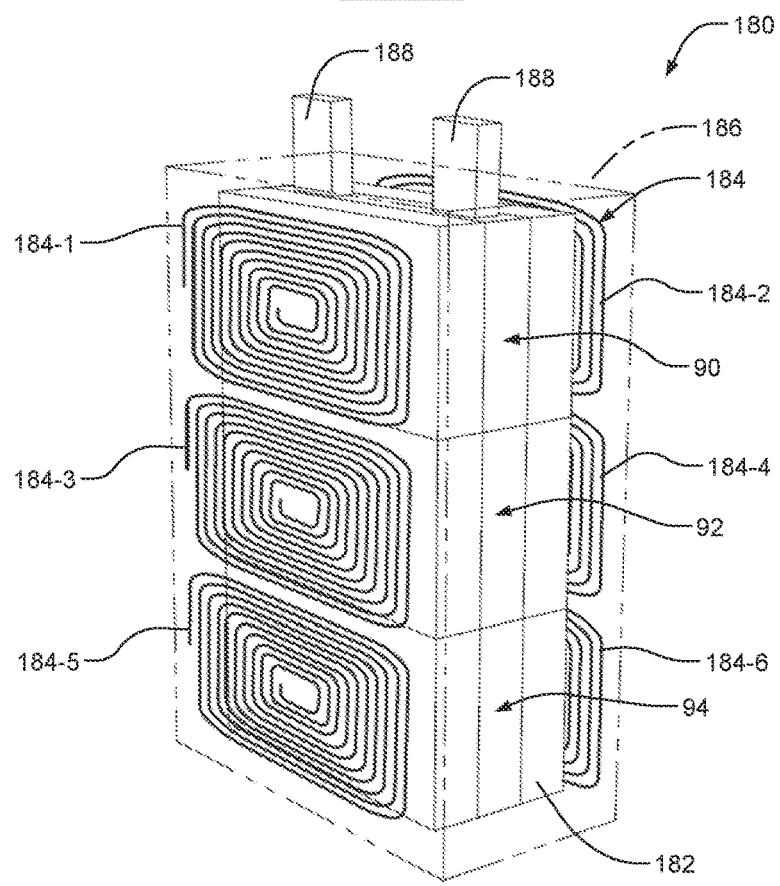
FIG. 9 is a perspective view of a regional-inductor electrochemical assembly according to various aspects of the present disclosure.

In various aspects, the present disclosure provides an electrochemical device configured to balance heat distribution in individual electrochemical cells. With reference to FIG. 9, an electrochemical assembly 180 according to various aspects of the present disclosure is provided. The assembly 180 includes an electrochemical cell 182 and a plurality of inductor coils 184. The electrochemical cell 182 is disposed within an insulating pouch 186 and includes tabs 188.

In certain aspects, the inductor coils 184 are planar inductor coils. Each inductor coil 184 is associated with and configured to heat a region of the electrochemical cell 182, which may be less than the entire electrochemical cell 182. By way of example, a quantity of inductor coils 184 in an electrochemical assembly 180 ranges from 1-20 per electrochemical cell, optionally 2-10, optionally 4-8, or optionally 6. A first portion of the inductor coils 184, such as half of the inductor coils 184, may be disposed substantially co-planar to one another and associated with a first current collector of the electrochemical cell 182. A second portion of the inductor coils 184, such as the other half of the inductor coils 184, may be disposed substantially co-planar to one another and associated with a second current collector of the electrochemical cell 182. The inductor coils 184 may be coupled directly to the insulating pouch 186 or coupled to distinct films, for example.

In one example, the plurality of inductor coils 184 includes six inductor coils: a first inductor coil 184-1, a second inductor coil 184-2, a third inductor coil 184-3, a fourth inductor coil 184-4, a fifth inductor coil 184-5, and a sixth inductor coil 184-6. The first, third, and fifth inductor coils 184-1, 184-3, and 184-5 are disposed substantially coplanar with one another. The second, fourth, and sixth inductor coils 184-2, 184-4, and 184-6 are disposed substantially coplanar with one another and substantially parallel to the first, third, and fifth inductor coils 184-1, 184-3, and 184-5.

The electrochemical cell 182 generally includes a first or upper region 190, a second or central region 192, and a third or lower region 194. The first and second inductor coils 184-1, 184-2 are disposed opposite one another across the first region 190 of the electrochemical cell 182. The first and second inductor coils 184-1, 184-2 configured to cooperate heat the first region 190 of the electrochemical cell 182. The third and fourth inductor coils 184-3, 184-4 are disposed opposite one another across the second region 192 of the electrochemical cell 182. The third and fourth inductor coils 184-3, 184-4 are configured to cooperate to heat the second region 192 of the electrochemical cell 182. The fifth and sixth inductor coils 184-5, 184-6 are disposed opposite one another across the third region 194 of the electrochemical cell 182. The fifth and sixth inductor coils 184-5, 184-6 configured to cooperate to heat the third region 194 of the electrochemical cell 182.

The inductor coils 184 are independently operable to induce eddy current in a respective region 190, 192, 194 of the electrochemical cell 182, thereby heating the respective regions 190, 192, 194 of the electrochemical cell 182. Therefore, the electrochemical assembly 180 is configured for balancing heat distribution in the electrochemical cell 182.

In one example, when the second region 192 of the electrochemical cell 182 reaches a desired temperature before the first and third regions 190, 194, the third and fourth inductor coils 184-3, 184-4 may be switched off while the first, second, fifth, and sixth inductor coils 184-1, 184-2, 184-5, 184-6 continue to receive current to heat the first and third regions 190, 194 of the electrochemical cell 182. Regional heating may be particularly useful in electrochemical cells having high aspect ratios, such as greater than or equal to 2, optionally greater than or equal to 4, optionally greater than or equal to 6, optionally greater than or equal to 8, or optionally greater than or equal to 10.

Figure 10:
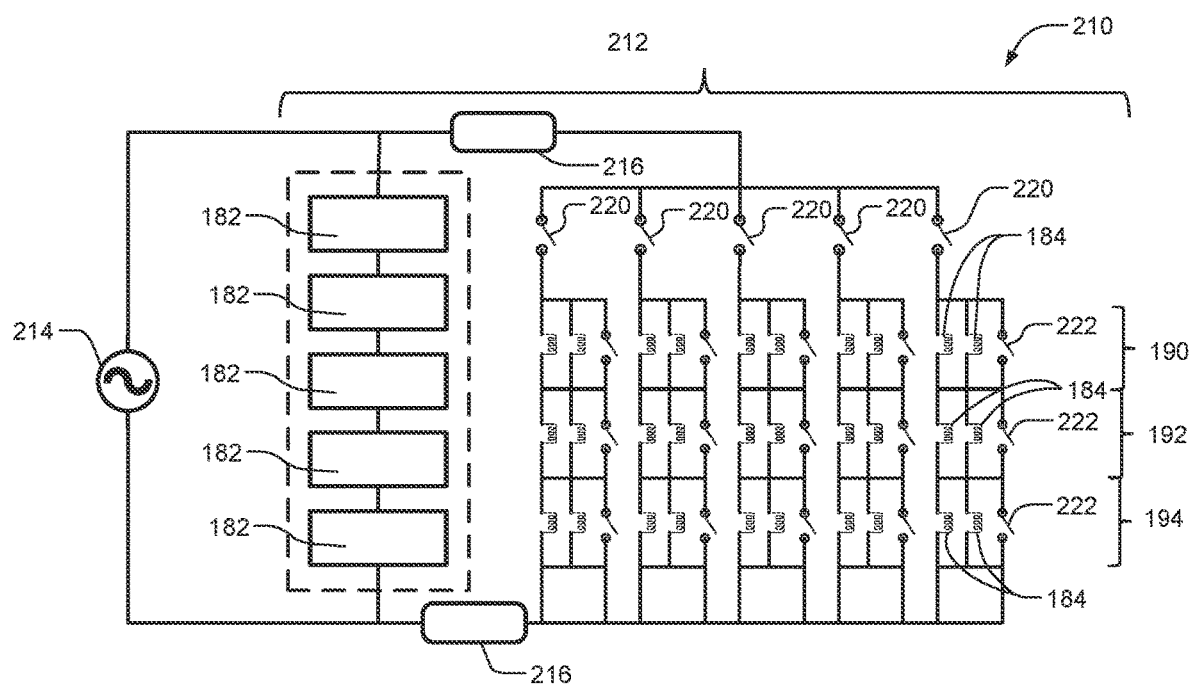
FIG. 10 is a circuit diagram of a system including a plurality of the electrochemical assemblies of FIG. 9 according to various aspects of the present disclosure.
Figure 11:
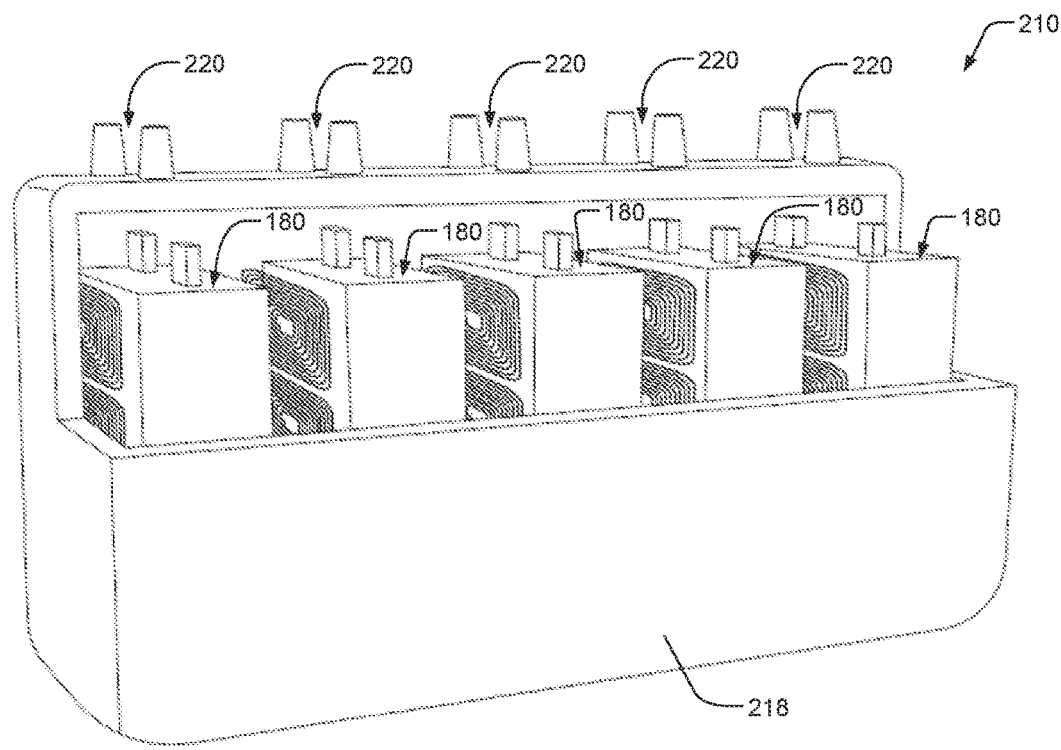
FIG. 11 is a perspective cutaway view of an electrochemical device of FIG. 10.

With reference to FIGS. 10-11, a system 210 (FIG. 10) according to various aspects of the present disclosure is provided. The system 210 generally includes an electrochemical device 212, an external power supply 214, and power inverters 216. In certain other aspects, the system 210 may be free of an external power supply and the inductor coils 184 may be powered by the electrochemical cells 182 (see, e.g., FIG. 19). The system 210 is configured for region cell heating. The device 212 includes a plurality of the assemblies 180 disposed within a case or shell 218 (FIG. 11)

The device 212 further includes a plurality of first switches 220 to control operation of the inductor coils 184 at a cell-by-cell level. For example, a single first switch 220 may control current to all of the inductor coils 184 associated with a single electrochemical cell 182. A plurality of second switches 222 controls operation of the inductor coils 184 at a region-by-region level. For example, a single second switch 222 may control current to all of the inductor coils 184 associated with a single region of a single electrochemical cell 182.

In certain aspects, a pair of inductor coils 184 associated with a single region of the electrochemical cell 182 (e.g., first and second inductor coils 184-1, 184-2 of FIG. 9) are connected in parallel with a single second switch 222. However, in certain other aspects, each inductor coil 184 may be provided with a separate switch (not shown).

Position of Inductor Coil

Inductor coils may generally be positioned to generate eddy current in at least one region of at least one electrochemical cell. In some examples, inductor coils may be disposed in an interior region of a case or shell, but outside of an insulating pouch. For example, the inductor coils 104, 144, and 184 of FIGS. 5, 7, and 11, respectively, are each disposed outside of an insulating pouch and inside of a case shell.

Figure 12:
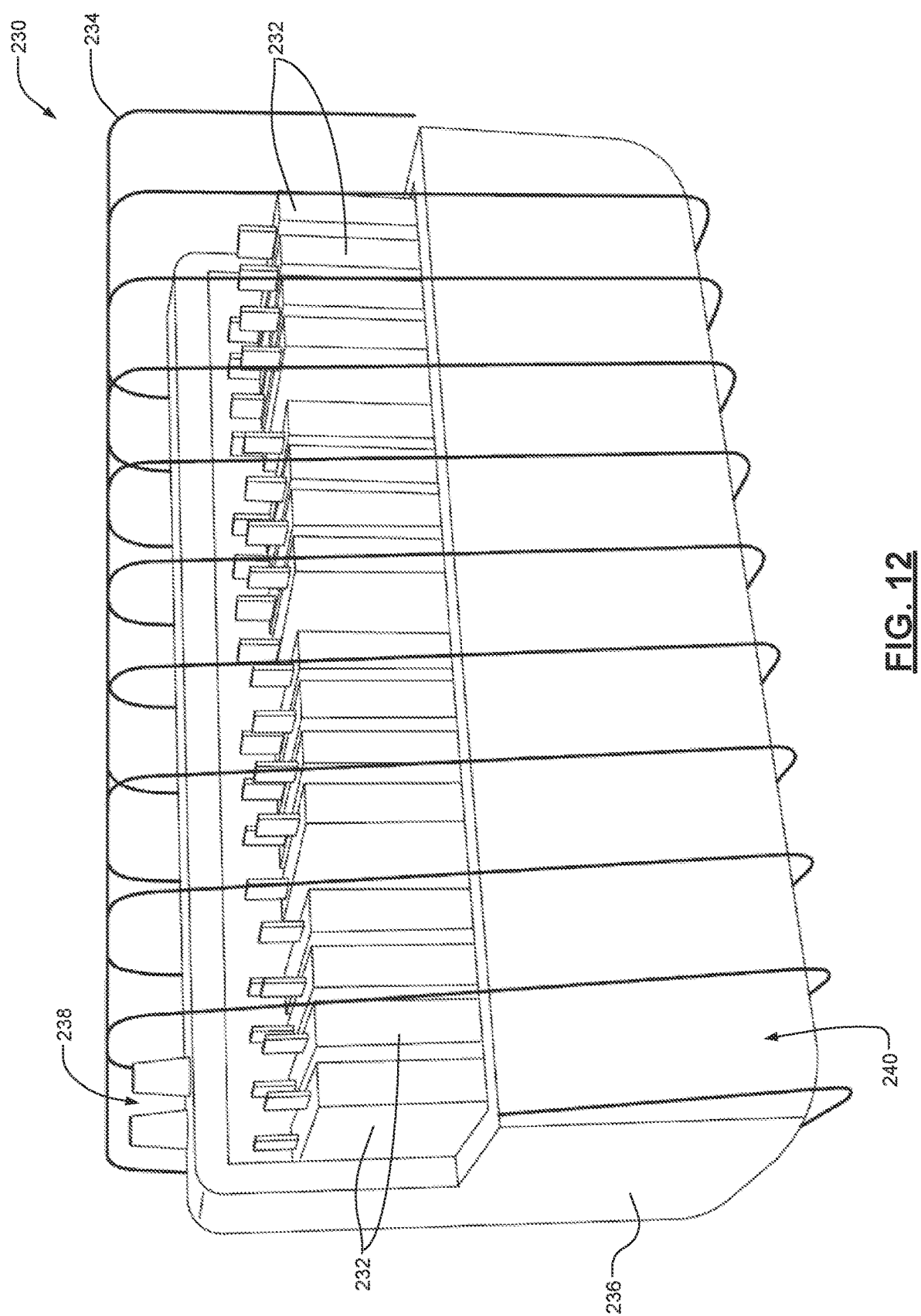
FIG. 12 is a perspective cutaway view of an electrochemical device having an exterior inductor coil according to various aspects of the present disclosure.

In other examples, inductor coils may be disposed outside of a case or shell. With reference to FIG. 12, another electrochemical device 230 according to various aspects of the present disclosure is provided. The device 230 includes a plurality of electrochemical cells 232, an inductor coil 234, which may be a peripheral inductor coil, a case or shell 236, and a switch 238. The inductor coil 234 is disposed around an exterior 240 of the case 236.

In other examples, inductor coils may be disposed inside of an insulating pouch. In one example, an inductor coil is between an insulating pouch and an electrochemical cell (e.g., a planar inductor coil is between an insulating pouch and a current collector). In another example, a planar inductor coil is embedded in a current collector. In yet another example, a planar inductor coil is integrated with a secondary heater (see discussion accompanying FIGS. 15-17). In yet another example, a planar inductor coil is disposed between current collectors. In other examples, an inductor coil is embedded in an insulating pouch itself.

The original design is, we add extra-heaters inside the cell, and coil can be integrated on these heaters after well insulated. Extra-tab need in this design. Although current collector/pouch looks too thin to embed coil currently, but it is a good idea. So I suggest we can include four cases of coils inside cells: coils embedded in pouch, in current collect, in extra-heater and independently but beside pouch.

Electromagnetic Shielding

An electrochemical device according to various aspects of the present disclosure may further include electromagnetic shielding. The electromagnetic shielding may improve uniformity of heat within the device. In certain aspects, the electromagnetic shielding is configured to reduce a magnetic field outside of the device. Accordingly, at least a portion of the shielding may be disposed adjacent to an outer portion of the device. In one example, electromagnetic shielding is in a form of sheets disposed at opposing ends of a stack of electrochemical cells. In another example, electromagnetic shielding is in a form of a box or case that surrounds at least a portion of the device.

The electromagnetic shielding may be formed from a conductive material. For example, the conductive material may include copper, alumina, steel, or any combination thereof. In certain aspects, the electromagnetic shielding material is selected based on its absorption properties, transmission properties, reflection properties, or any combination thereof. In one example, a shield is configured to absorb a magnetic field to reduce or prevent reflection of the magnetic field back into an electrochemical cell. In another example, a shield is configured to reflect a magnetic field back into an electrochemical cell to increase eddy current and heat in the cell.

Figure 13:
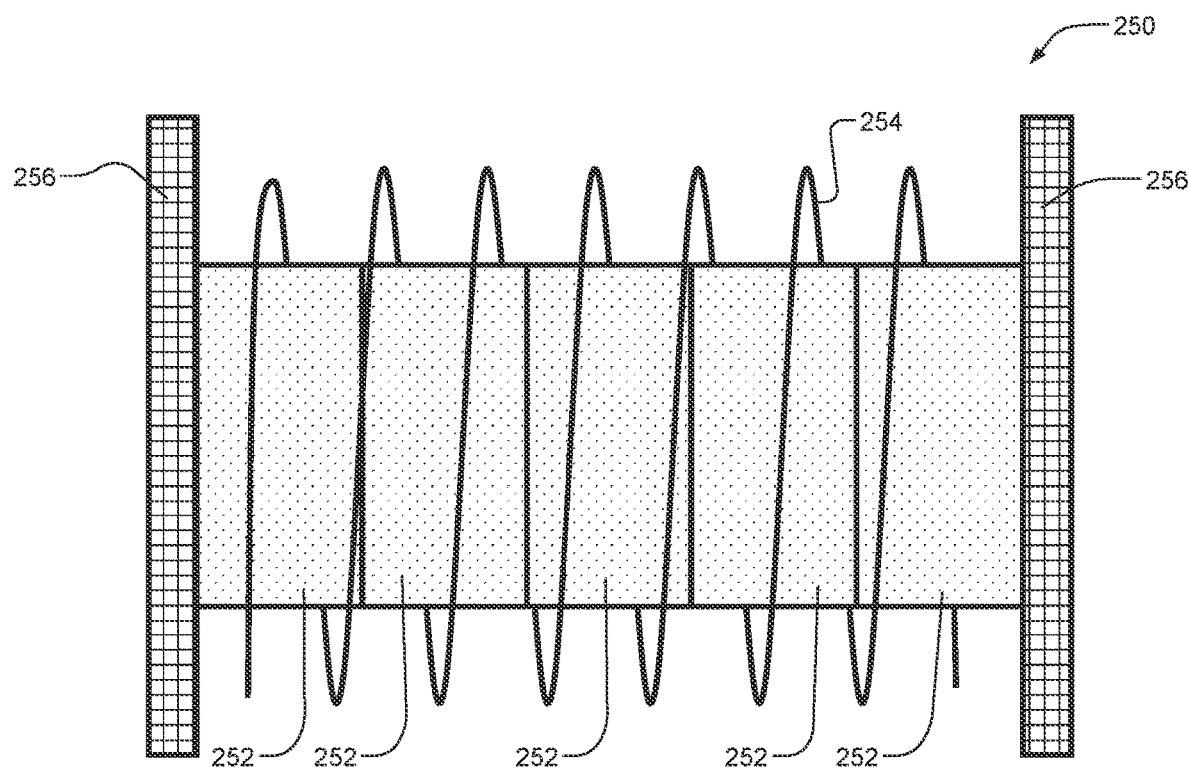
FIG. 13 is a partial schematic view of an electrochemical device having electromagnetic shielding and a peripheral inductor coil according to various aspects of the present disclosure.

Referring to FIG. 13, a portion of an electrochemical device 250 according to various aspects of the present disclosure is provided. The device 250 includes a plurality of electrochemical cells 252 and an inductor coil 254. The electrochemical cells 252 may be similar to the electrochemical cell 12 of FIGS. 1-2. The inductor coil 254 is a peripheral inductor coil.

The device 250 further includes electromagnetic shields 256. The electromagnetic shields 256 are in the form of sheets. The electromagnetic shields 256 are disposed on opposing sides of the device 250 such that the electrochemical cells 252 and the inductor coil 254 are disposed therebetween.

Figure 14:
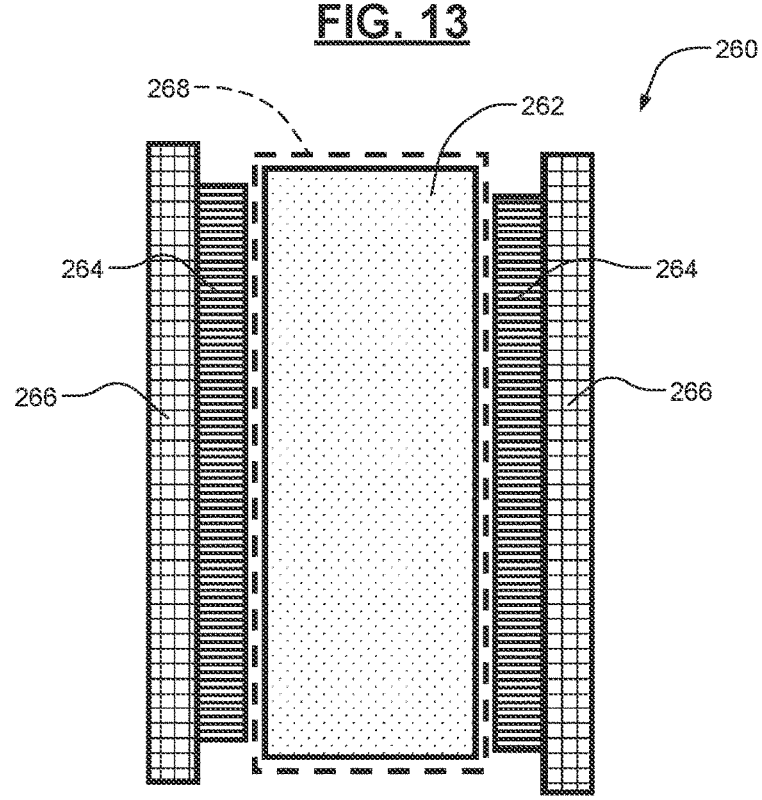
FIG. 14 is a sectional view of an electrochemical assembly having electromagnetic shielding and planar inductor coils according to various aspects of the present disclosure.

With reference to FIG. 14, an electrochemical assembly 260 according to various aspects of the present disclosure is provided. The electrochemical assembly 260 generally includes an electrochemical cell 262, inductor coils 264, and electromagnetic shields 266. The electrochemical cell 262 may be similar to the electrochemical cell 12 of FIGS. 1-2. The inductor coils 264 are planar inductor coils.

The electromagnetic shields 266 are in a form of sheets. The electromagnetic shields are disposed on opposing sides of the assembly 260 such that the assembly 260 is disposed between the electromagnetic shields 266. Each inductor coil 264 is disposed between an insulating pouch 268 of the electrochemical cell 262 and a respective electromagnetic shield 266.

Secondary Heater

An electrochemical device according to various aspects of the present disclosure may further include an additional or secondary heater. The secondary heater is configured to heat via induced eddy current from inductor coils. In certain aspects, a secondary heater may be in a form of a foil or plate, a mesh, a porous plane having an open-cell structure that is penetrable to electrolyte, a sponge-like three-dimensional woven or non-woven network, or any combination thereof.

In certain aspects, a secondary heater may be formed from a ferromagnetic material. Ferromagnetic materials include iron, nickel, cobalt, stainless steel, or any combination thereof, by way of example. An electrochemical device having one or more secondary heaters has higher efficiency and power than an electrochemical device that is free of a secondary heater. More particularly, because ferromagnetic materials have higher receiving efficiency under an alternating magnetic field than non-magnetic materials, heaters including the ferromagnetic materials can generate more powerful eddy current than in non-magnetic materials.

A secondary heater may be disposed substantially parallel to current collectors of an electrochemical cell. An electrochemical device may include a single secondary heater or a plurality of secondary heaters (e.g., one secondary heater for an entire device, one secondary heater per electrochemical cell, a pair of secondary heaters per electrochemical cell, or more than two secondary heaters per electrochemical cell). Secondary heaters may be used in combination with other components described herein, such as electromagnetic shielding.

Figure 16:
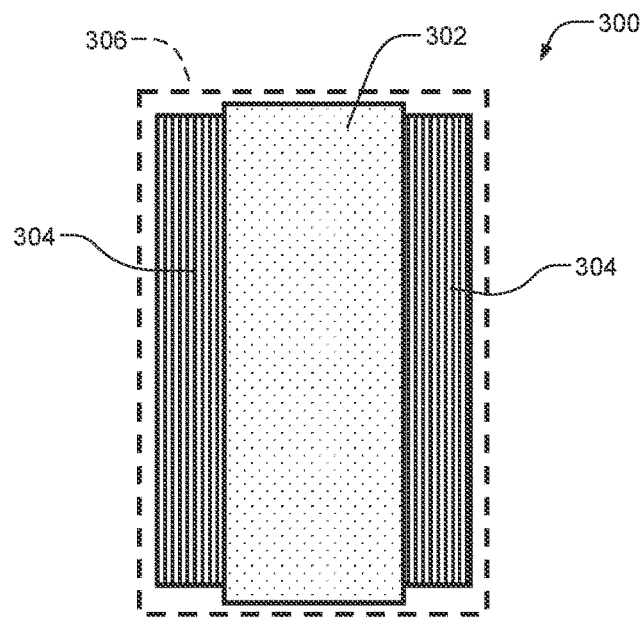
FIG. 16 is a sectional view of another electrochemical cell having integrated heaters according to various aspects of the present disclosure.
Figure 17:
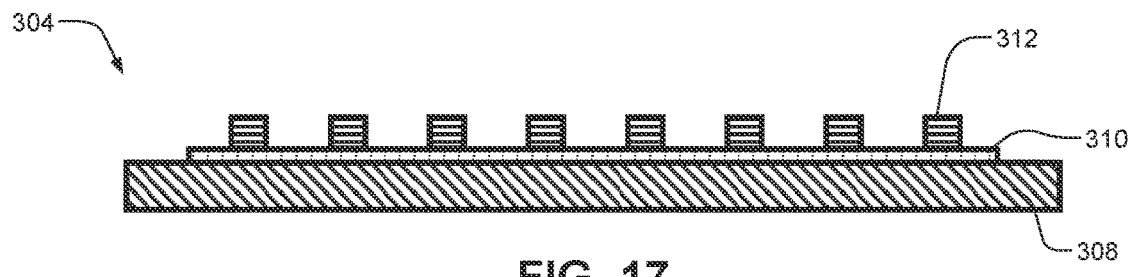
FIG. 17 is a sectional view of an integrated heater of FIG. 16.

In one example, a secondary heater is disposed inside an insulating pouch, between a current collector and a portion of the insulating pouch. In another example, a secondary heater is integrated with an inductor coil to form an integrated heater (FIGS. 16-17). In yet another example, a secondary heater is disposed between the current collectors of an electrochemical cell. The secondary heater is protected by one or more separators (such as between two separators), is ion conducting, and may be penetrable by liquid or gel electrolyte. The secondary heater may be located within a device based on a thermal distribution of the device, such as near cold spots in the electrochemical cell. In certain aspects, the secondary heater is disposed near or intersecting a center of mass of the electrochemical cell.

Figure 15:
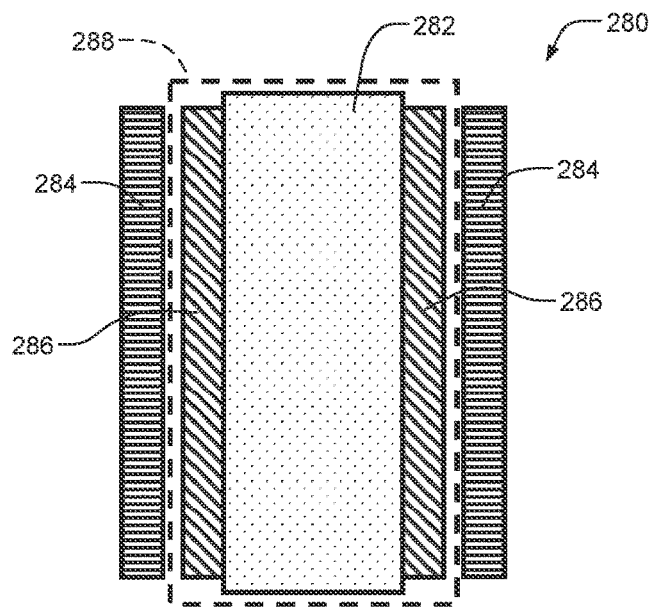
FIG. 15 is a sectional view of an electrochemical assembly having a secondary heater and planar inductor coils according to various aspects of the present disclosure.

Referring to FIG. 15, an electrochemical assembly 280 according to various aspects of the present disclosure is provided. The assembly 280 includes an electrochemical cell 282, inductor coils 284, and a pair of additional or secondary heaters 286. The electrochemical cell 282 may be similar to the electrochemical cell 12 of FIGS. 1-2. The inductor coils 284 include two planar induction coils. However, the use of secondary heater is equally applicable to electrochemical assemblies having other quantities or types (e.g., peripheral) inductor coils.

The secondary heaters 286 are in a form of foils or plates. The secondary heaters 286 include two secondary heaters; however, the electrochemical assembly may alternatively have different quantities of heaters. The heaters 286 are disposed between an insulating pouch 288 of the electrochemical cell 282 and a respective coil 284.

With reference to FIG. 16, another electrochemical assembly 300 according to various aspects of the present disclosure is provided. The assembly 300 includes an electrochemical cell 302 and a pair of integrated heaters 304. The electrochemical cell 302 and integrated heaters 304 are disposed at least partially within an insulated pouch 306.

Referring to FIG. 17, each integrated heater 304 includes a heater 308, an insulator 310, and an inductor coil 312. The insulating 310 is between the heater 308 and the inductor coil 312. The heater 308, the insulating 310, and the inductor coil 312 may be coupled to one another. The inductor coil 312 is a planar inductor coil. The insulator 310 may be formed from a plastic, such as nylon. When the heaters 304 are disposed within the insulating pouch 306, as here, the integrated heaters 304 further include tabs for introducing current into the coils 312, but not the heaters 308.

All-Solid-State Device

Figure 18:
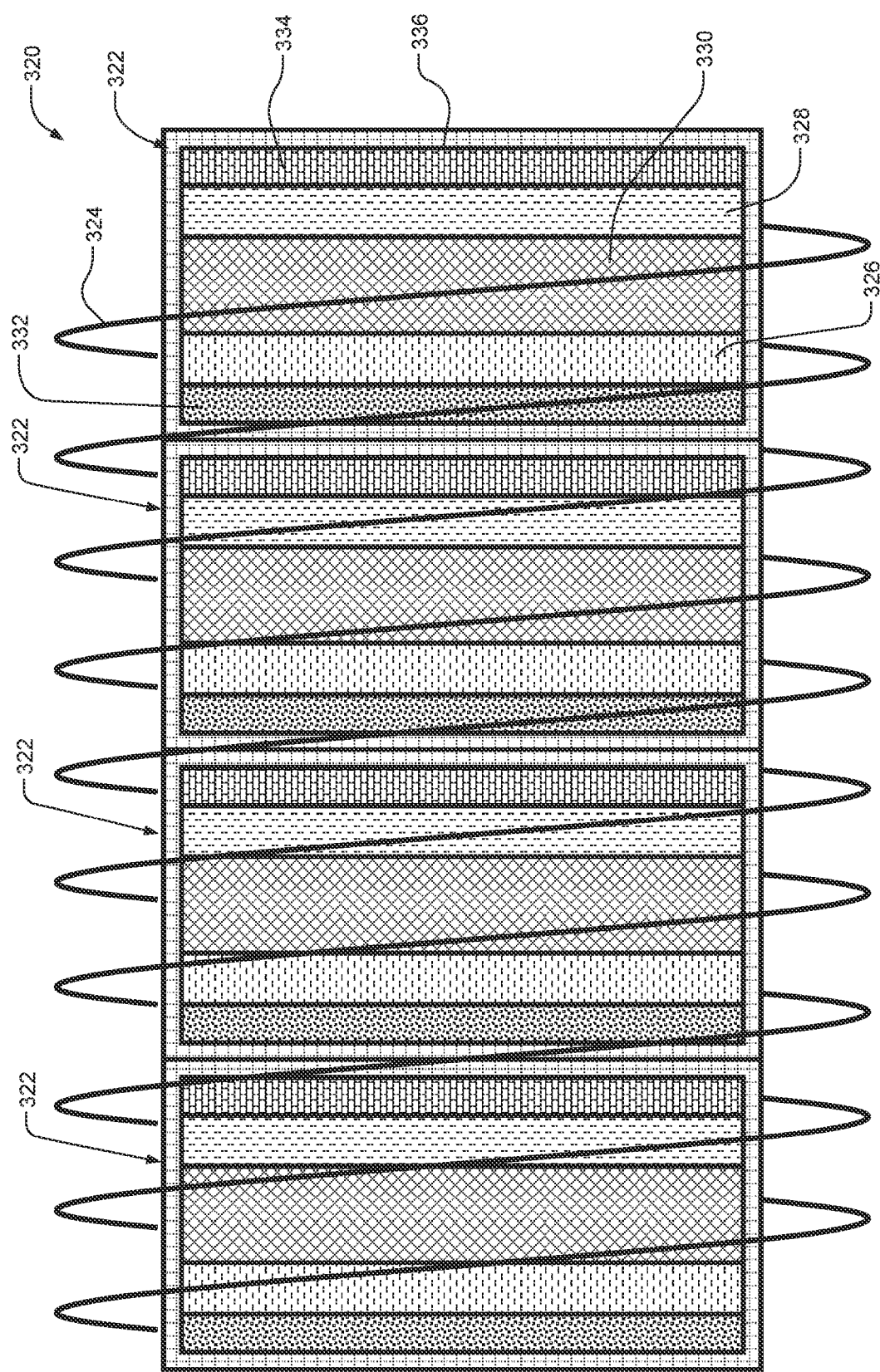
FIG. 18 is a partial schematic view of an all-solid-state electrochemical device according to various aspects of the present disclosure.

With reference to FIG. 18, the present disclosure provides an all-solid-state electrochemical assembly 320. All-solid-state electrochemical cells are stable against high temperatures and therefore capable of higher heating power and a shorter heating time. However, in certain aspects, all-solid-state electrochemical cells may have performance that is significantly affected by large temperature swings, and in particular, very low temperatures. Therefore, an ability to rapidly heat all-solid-state systems is particularly beneficial.

The assembly 320 includes a plurality of electrochemical cells 322 in a stack and an inductor coil 324. Each electrochemical cell 322 includes a first or positive electrode 326, a second or negative electrode 328, a solid-state electrolyte 330, a first or positive electrode current collector 332, and a second or negative electrode current collector 334. Each electrochemical cell 322 is disposed within an insulating pouch 336 or between separators.

In one example, four assemblies 320 are used in a 48-volt 4S4P bipolar solid-state device (not shown). Accordingly, the device includes a total of sixteen electrochemical cells 322 (four groups of four serially-connected cells are connected in parallel) and four inductor coils 324. The positive electrodes 326 include lithium iron phosphate (LiFePO$_4$, "LFP"). The negative electrodes 328 include graphite. The positive electrode current collectors 332 include aluminum. The negative electrode current collectors 334 include copper. In certain aspects, the solid-state electrolyte 330 includes an oxide including garnet (e.g., Li$_7$La$_3$Zr$_2$Oi$_2$ or doped species), a sodium super ionic conductor (NASICON) (e.g., Li$_{1-x}$Al$_x$Ti$_{2-x}$(PO$_4$)$_3$ or doped species), perovskite type (Li$_{0.5}$La$_{0.5}$TiO$_3$ or doped species), and sulfide (e.g., argyrodite, and Li—P—S species). Additionally or alternatively, the solid-state electrolyte may include one or more polymer.

Powering Inductor Coils

Inductor coils according to various aspects of the present disclosure may be powered by the electrochemical cell or cells that it heats, one or more additional electrochemical cells not heated by the inductor coil, an external power source, or any combination thereof.

Figure 19:
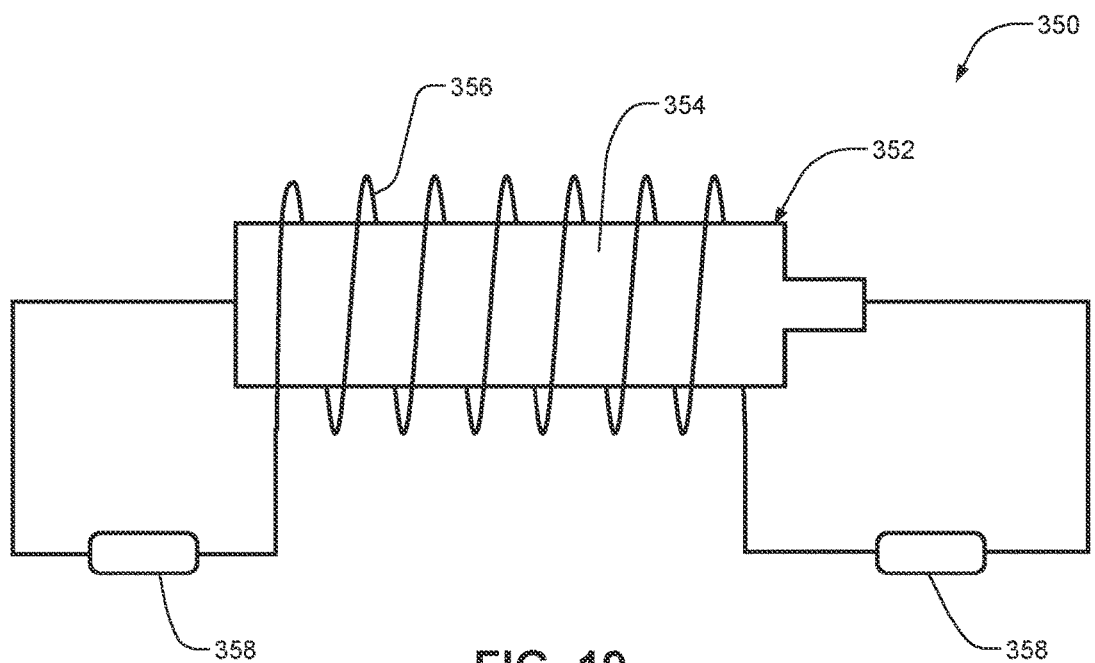
FIG. 19 is a circuit diagram of a system including an electrochemical device, the system being free of an external power source.

Referring to FIG. 19, a system 350 according to various aspects of the present disclosure is provided. The system 350 includes an electrochemical device 352. The electrochemical device 352 includes an electrochemical cell 354 and an inductor coil 356. Although the inductor coil 356 is shown as a peripheral inductor coil, the inductor coil 356 may alternatively be a planar inductor coil or a combination of a peripheral inductor coil and a planar inductor coil.

The inductor coil 356 is electrically connected to the electrochemical cell 354. The system 350 further includes two power inverters 358 to convert direct current from the electrochemical cell 354 to alternating current to be received by the inductor coil 356. The inductor coil 356 is powered solely by the electrochemical cell 354. Therefore, the system 350 is free of an additional power source. In certain aspects, the system 350 may be used in a battery electric vehicle ("BEV") or a hybrid electric vehicle ("HEV"). In one example, the electrochemical cell 354 is a low-voltage cell and the system 350 is expected to face non-rigorous climates. In various aspects, the system 350 may be referred to as a "solely heating system."

Figure 20:
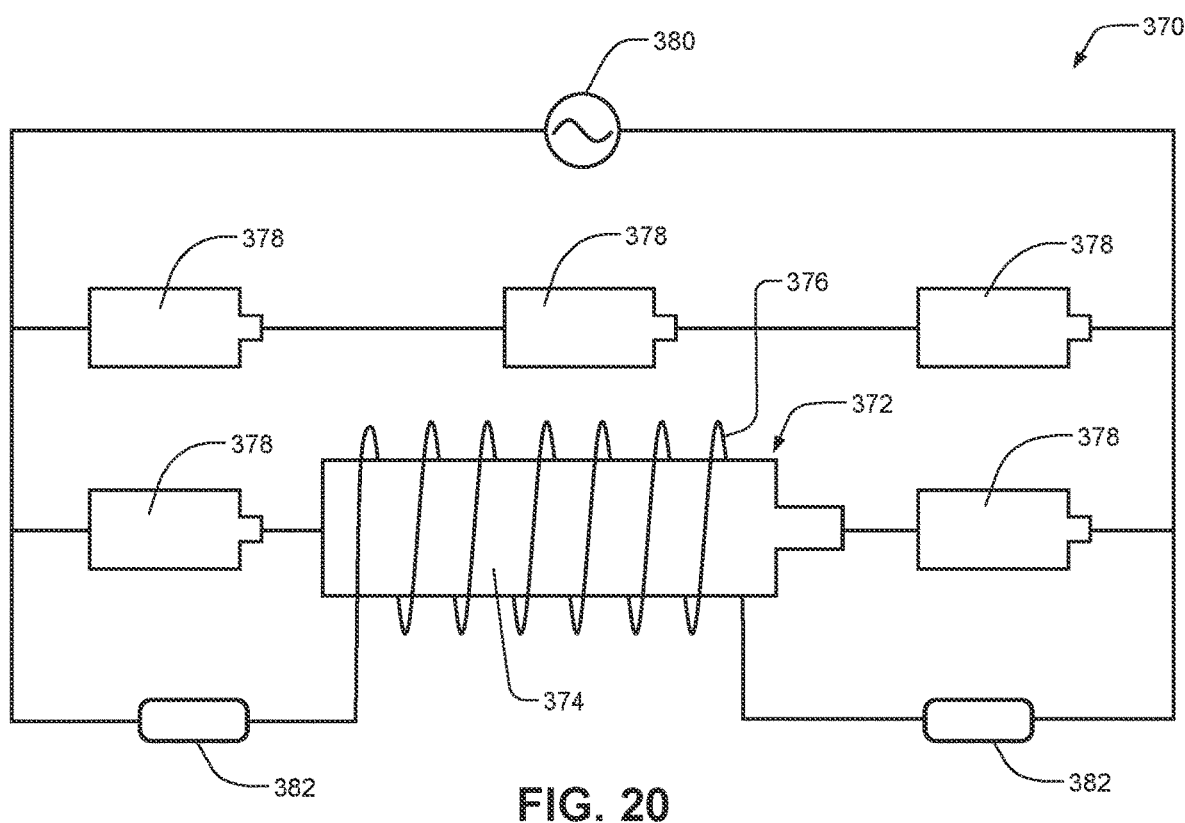
FIG. 20 is a circuit diagram for a system including an electrochemical device, the system including a plurality of secondary electrochemical cells and additional external power source.

With reference to FIG. 20, a system 370 according to various aspects of the present disclosure is provided. The system 370 includes an electrochemical device 372. The electrochemical device 372 includes a first electrochemical cell 374 and an inductor coil 376. The inductor coil 376 is configured to internally heat the first electrochemical cell 374 using eddy current. The system 370 further includes a plurality of second electrochemical cells 378 an external power source 380.

The inductor coil 376 is configured to receive power from the second electrochemical cells 378 and/or the external power source 380. The system 370 further includes two power inverters 382 to convert direct current to alternating current to be received by the inductor coil 376. In certain aspects, the inductor coil 376 includes a plurality of independently operable inductor coils configured to heat different regions of the first electrochemical cell 374 (see, e.g., the electrochemical assembly 180 of FIG. 9). In certain aspects, the first electrochemical cell 374 includes a plurality of electrochemical cells and the inductor coil 376 includes a plurality of inductor coils configured to heat the plurality of electrochemical cells. The second electrochemical cells 378 and/or the external power source 380 may be configured to deliver heat to only a portion of the plurality of inductor coils to quickly warm up a portion of the electrochemical cells or a portion of a single electrochemical cell.

The system 370 may be particularly useful when the first electrochemical cell 374 is a low-voltage cell, the system 370 is expected to be exposed to extreme temperatures (e.g., ultra-low temperatures), the system 370 will be used for a start/stop task, and/or the electrochemical cell 374 would benefit from rapid heating. In various aspects, the system 370 is referred to as a "synergetic heating system."

Methods of Heating Electrochemical Devices

In various aspects, the present disclosure provides a method of internally heating an electrochemical cell. The method includes providing an electrochemical cell including a current collector comprising an electrically-conductive material and an inductor coil. The method further includes determining that a temperature of the electrochemical cell is outside of a desired range. The method further includes providing an alternating current to the inductor coil to generate a magnetic field. The magnetic field induces an eddy current in the current collector to generate heat in the current collector, thereby internally heating the electrochemical cell.

Methods of Controlling Heat in an Electrochemical Device

The present disclosure provides, in various aspects, methods of controlling heating of an electrochemical device. More specifically, power to one or more inductor coils of an electrochemical device may be controlled to increase a temperature of the electrochemical cell and/or prevent the electrochemical cell from cooling down. Control may be reactive and/or proactive.

Figure 21:
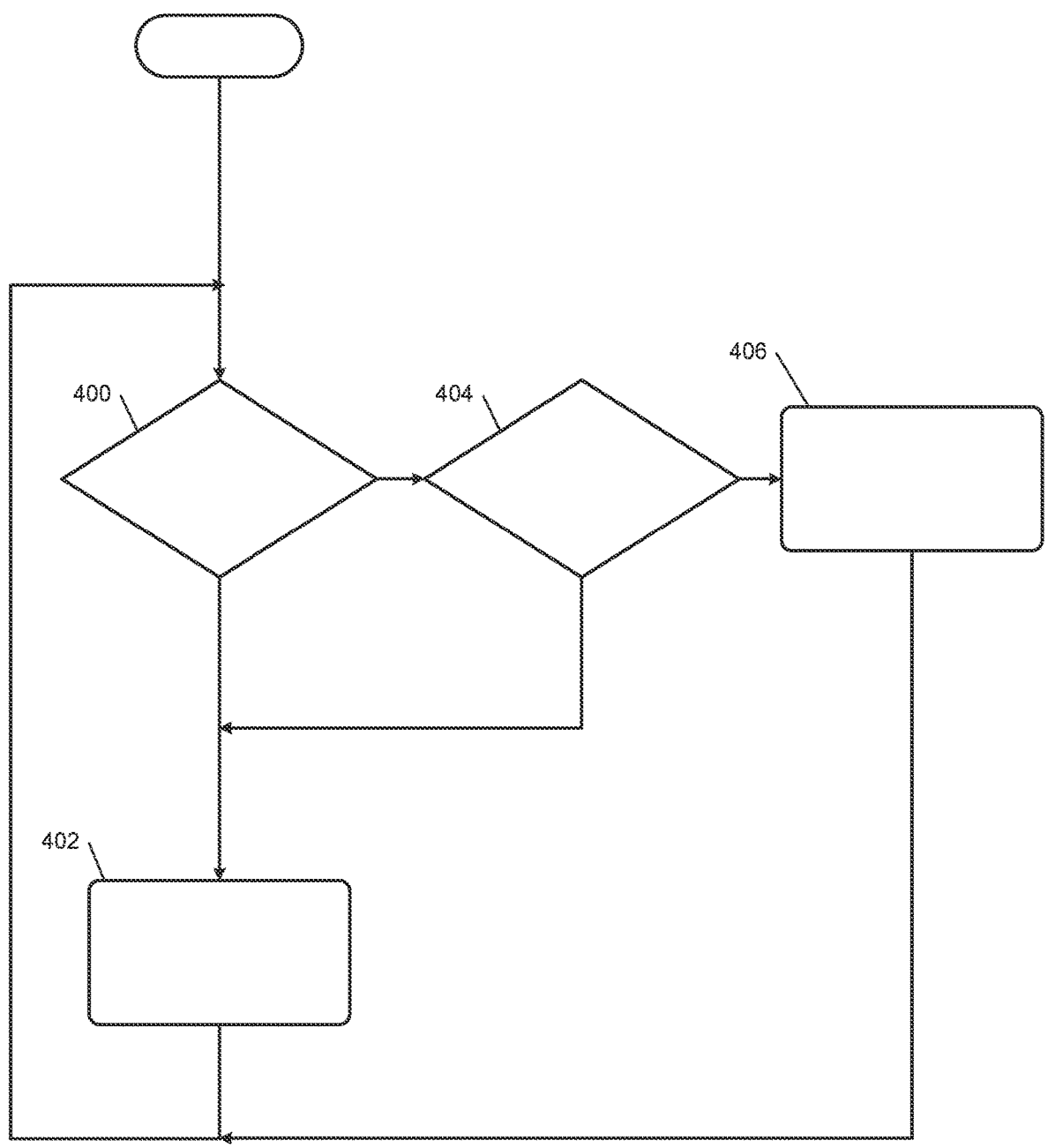
FIG. 21 is a flowchart depicting a method of controlling heating of an electrochemical device according to various aspects of the present disclosure.

With reference to FIG. 21, a flowchart depicting a method of controlling heating of an electrochemical device according to various aspects of the present disclosure is provided. The method will be described with reference to the electrochemical device 82 of FIGS. 4-5; however, the method is applicable to any of the electrochemical devices or assemblies described herein. The method steps may be performed by a controller.

At 400, control determines whether a temperature of the electrochemical cell 84 is outside of a desired range. The temperature may be a single temperature within the device 82, a temperature for an individual electrochemical cell 102, or a temperature for a region of an electrochemical cell 102 (e.g., periphery of a positive electrode). In certain aspects, control may repeat this step for a plurality of inductor coils and corresponding regions within an electrochemical device.

In one example, determining whether the temperature is outside of the desired range may include detecting an actual temperature, such as by thermocouples within the electrochemical device 82. In another example, determining whether the temperature is outside of the desired range may include determining whether other characteristics, such as impedance, are outside of a desired range. The variation of these characteristics may be caused by temperature change and therefore be indicative of temperature change. In yet another example, determining whether the temperature is outside of the desired range may include predicting that the temperature is outside of the desired range based on the occurrence of an event, such as parking. The determination may take other factors into account, such as a temperature of the environment and/or the season or date.

If control determines that that temperature is outside of the desired range, the method continues at 402. Otherwise, the method continues at 404.

At 402, control closes the switch 94 (or ensures that the switch 94 is closed) to power the inductor coil 86 to generate a magnetic field, induce eddy current in conductive components of the electrochemical cells 84, and internally heat the electrochemical cells 84. The method returns to 400.

At 404, control determines whether preemptive heating is desired. Preemptive heating may include powering the inductor coil 86 to prevent the electrochemical cells 84 from cooling down, such as when a vehicle is parked. Preventing or reducing cool down of the electrochemical cells 84 makes the electrochemical cells available for use more quickly than in a system without internal heating. In certain aspects, the electrochemical cells 84 may be immediately available for use. Control may determine whether preemptive heating is required based on a temperature of the environment or the occurrence of an event, among other factors.

If preemptive heating is desired, the method proceeds to 402. Otherwise, the method continues to 406.

At 406, control opens the switch 94 (or ensures that the switch 94 is open). Accordingly, the inductor coil 86 is not powered and the electrochemical cells 84 are not heated. The method returns to 400.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrochemical device comprising:
    an electrochemical cell including a current collector, the current collector including an electrically-conductive material;

an inductor coil configured to generate a magnetic field, the magnetic field configured to induce an eddy current in the current collector to generate heat in the current collector; and an insulating pouch at least partially enclosing the electrochemical cell, the inductor coil at least partially disposed inside the insulating pouch.

2. The electrochemical device of claim 1, wherein
the inductor coil defines a coil interior region, and
the electrochemical cell is at least partially disposed within the coil interior region.

3. The electrochemical device of claim 1, wherein the inductor coil has a substantially planar spiral shape.

4. The electrochemical device of claim 3, wherein
the current collector is a first current collector and the electrochemical cell further includes a second current collector substantially parallel to the first current collector,
the inductor coil includes a first inductor coil associated with the first current collector and a second inductor coil associated with the second current collector.

5. An electrochemical device comprising:
an electrochemical cell including a current collector, the current collector including an electrically-conductive material; and
a plurality of inductor coils, each of the plurality of inductor coils
has a substantially planar shape,
configured to generate a magnetic field, the magnetic field configured to induce an eddy current in the current collector to generate heat in the current collector,
configured to individually receive current independent of the other inductor coils of the plurality of inductor coils, and
configured to induce eddy current in a respective region of the current collector.

6. The electrochemical device of claim 1, wherein the electrochemical cell includes a plurality of electrochemical cells and the insulating pouch includes a plurality of insulating pouches, the electrochemical cells being at least partially enclosed in the insulating pouches, respectively.

7. The electrochemical device of claim 6, wherein the inductor coil includes a single inductor coil.

8. The electrochemical device of claim 6, wherein
the inductor coil includes a plurality of inductor coils,
each inductor coil of the plurality of inductor coils is configured to individually receive current independent of the other inductor coils of the plurality of inductor coils, and
each inductor coil of the plurality of inductor coils is configured to heat a respective region of the electrochemical device.

9. The electrochemical device of claim 7, claim 1, further comprising:
a case defining a case interior region, wherein
the electrochemical cell and the insulating pouch at least partially disposed within the case interior region, and
the inductor coil is between the case and the insulating pouch.

10. The electrochemical device of claim 1, further comprising:
an electromagnetic shield configured to reduce the magnetic field outside of the electrochemical cell.

11. The electrochemical device of claim 1, further comprising:
a heater including a ferromagnetic material, wherein the magnetic field is configured to induce an eddy current in the heater to heat the heater.

12. The electrochemical device of claim 1, wherein
the electrochemical cell is a solid-state electrochemical cell,
the current collector includes a first current collector and a second current collector, and
the electrochemical cell further includes a positive electrode in electrical communication with the first current collector, a negative electrode in electrical communication with the second current collector, and a solid-state electrolyte between the positive electrode and the negative electrode.

13. The electrochemical device of claim 1, wherein
the electrochemical cell is electrically connected to the inductor coil and configured to generate a current in the inductor coil, and
the electrochemical device is free of an external power source.

14. The electrochemical device of claim 1, wherein the inductor coil is configured to conduct alternating current having a frequency of greater than or equal to 10 Hz to less than or equal to 200 kHz.

15. The electrochemical device of claim 10, wherein the electromagnetic shield comprises copper, alumina, steel, or any combination thereof.

16. The electrochemical device of claim 5, wherein the inductor coils of the plurality of inductor coils are disposed substantially coplanar to one another.

17. The electrochemical device of claim 5, wherein
the electrochemical cell is electrically connected to the plurality of inductor coils and configured to generate a current in the plurality of inductor coils, and
the electrochemical device is free of an external power source.

18. The electrochemical device of claim 5, wherein each of the plurality of inductor coils includes a plurality of substantially rectangular windings.

19. An electrochemical device comprising:
an electrochemical cell including a current collector, the current collector including an electrically-conductive material; and
an integrated heater including,
an inductor coil configured to generate a magnetic field, the magnetic field configured to induce an eddy current in the current collector to generate heat in the current collector, the inductor coil having a substantially planar shape,
a heater substantially parallel to the inductor coil, a heater including a ferromagnetic material, wherein the magnetic field is configured to induce an eddy current in the heater to heat the heater, and
an insulator between the inductor coil and the heater.

20. The electrochemical cell of claim 19, further comprising:
an insulating pouch, the electrochemical cell and the integrated heater at least partially disposed within the insulating pouch.

* * * * *